(12) United States Patent
Cooper et al.

(10) Patent No.: US 11,995,486 B2
(45) Date of Patent: May 28, 2024

(54) SYSTEMS AND METHODS FOR INTEGRATING COMPUTER APPLICATIONS

(71) Applicants: Atlassian Pty Ltd., Sydney (AU); Atlassian US, Inc., San Francisco, CA (US)

(72) Inventors: Michael Cooper, Sydney (AU); Emma Young, Sydney (AU); Liron Deutsch, Sydney (AU); Rohan Fleming, Sydney (AU); Iris Zhang, Sydney (AU); Daniel Brockwell, Sydney (AU); Jacob Bass, Sydney (AU); Duy Nguyen, Sydney (AU); Gerry Tan, Sydney (AU); Daniel Kostrzynski, Sydney (AU); Dmitry Gonchar, Sydney (AU); Jason Thai, Sydney (AU); Banu Prakash Jaya Rama Reddy, Sydney (AU); Shiveen Pandita, Sydney (AU); Julian Green, Sydney (AU); Kimmi Rawsthorne, Sydney (AU); Christopher Mann, Sydney (AU); Akhil Ojha, Bengaluru (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/118,112

(22) Filed: Mar. 6, 2023

(65) Prior Publication Data
US 2023/0259414 A1 Aug. 17, 2023

Related U.S. Application Data

(63) Continuation of application No. 17/364,433, filed on Jun. 30, 2021, now Pat. No. 11,599,399.

(51) Int. Cl.
*G06F 9/54* (2006.01)
*G06F 16/903* (2019.01)

(52) U.S. Cl.
CPC ........ *G06F 9/542* (2013.01); *G06F 16/90335* (2019.01)

(58) Field of Classification Search
CPC ............. G06F 9/465; G06F 9/54; G06F 9/542
See application file for complete search history.

(56) References Cited

U.S. PATENT DOCUMENTS

| 8,667,057 B1 | 3/2014 | Adya et al. |
| 8,799,922 B2 | 8/2014 | Rajan et al. |

(Continued)

*Primary Examiner* — Andy Ho
(74) *Attorney, Agent, or Firm* — Brownstein Hyatt Farber Schreck, LLP

(57) ABSTRACT

Computer-implemented methods and systems for integrating computer applications are disclosed. One method includes querying a primary computer application for current state of a newly created object; receiving the current state of the object, and generating object data for a secondary computer application based on the current state of the object. The method further includes communicating an object creation request to a secondary computer application, the object creation request including the generated object data, receiving a secondary computer application object identifier from the secondary computer application upon creation of the object at the secondary computer application, and communicating the secondary computer application object identifier to the primary computer application for storing in a record of the object created at the primary computer application.

20 Claims, 13 Drawing Sheets

(56) References Cited

U.S. PATENT DOCUMENTS

| | | |
|---|---|---|
| 9,948,703 B2 | 4/2018 | Olivier et al. |
| 11,231,974 B2 | 1/2022 | Bhagat et al. |
| 2015/0128152 A1 | 5/2015 | Lachaume et al. |
| 2021/0365410 A1 | 11/2021 | Bonfiglio et al. |

700

Can't access payroll　　　　　　　　　　　　　OPEN

[Notify responder ▼]  [Link issue ▼]

Summary  Investgation details  Linked  Analytics  Comments  Timeline  Work log

Annette Benning raised this integrated issue
I can't login to the payroll platform to export my pay from the system...

Priority: High
Affected services: Notifications, payroll

People
Assigned team: Maintenance
Owner: Jane Smith
Responders: Jane Smith, John Jones

[Add responder]  [Initiate comm session]

SLAs
Time to first response (2h): 1h 56m
Time to resolution (4h): 3h 56m

● 14:00 -- VC session started
● 20:57 -- VC session ended
● 20:15 -- VC session started
(JS) 20:38 -- Jane Smith
     Working on a fix
● 12:05 -- alert acked -- Jane Smith

Fig. 7

Can't access payroll

RESOLVED

Notify responder ▼   Link issue ▼

Summary  Investgation details  Linked  Analytics  Comments  Timeline  Work log

POSTMORTEM REPORT

Leadup
Describe the circumstances that led to this integrated issue

Fault
Describe what failed to work as expected

Detection
Describe how the incident was detected

Root causes
Run an analysis to understand the true causes of the integrated issue

Mitigation and resolution
What steps did you take to resolve this incident?

Lessons learnt
What went well? What could have gone better? What else did you learn?

Add attachments

Add related integrated issues

SYSTEMS AND METHODS FOR INTEGRATING COMPUTER APPLICATIONS

CROSS-REFERENCE TO RELATED APPLICATION(S)

This application is a continuation patent application of U.S. patent application Ser. No. 17/364,433, filed Jun. 30, 2021 and titled "Systems and Methods for Integrating Computer Applications," the disclosure of which is hereby incorporated herein by reference in its entirety.

FIELD

Aspects of the present disclosure are directed to computer applications and more particularly to integrating two or more computer applications to provide a common frontend.

BACKGROUND

Typically computer applications are created to offer specific features to users. For example, one computer application may be developed to provide an online real time chat service whereas another computer application may be developed to deliver another service, such as online collaboration for projects. Over time, many developments may be made in both computer applications as they grow and each computer application may have a rich and complex backend system that supports the corresponding computer application.

Over time, situations may arise where it might be beneficial to integrate the features of one of the computer application with features offered by the other computer application—e.g., it might be beneficial to offer the real time chat service of the first computer application to the online collaboration service offered by the second computer application.

However, the two computer applications are often developed by different parties, totally independently and without any regard to the possible future integration with other computer applications. Therefore, the process of integration of two existing computer applications often involves solving numerous technical compatibility issues in order for the existing products to function together in a relatively cohesive fashion. In such cases, it might be possible to develop the features offered by the first computer application into the second computer application. However this may be too computationally expensive, may require many man hours to accomplish and even then, the newly developed real time online chat features developed in the second computer application may not be able to replicate the quality of the features offered by the first computer application (which has been refined over time).

Accordingly, there exists a need for simpler, more efficient mechanism for introducing the features of an external computer application in a given computer application.

SUMMARY

Example embodiments described herein are directed to a computer-implemented method. The method includes receiving an object creation event in respect of an object created at a primary computer application. The object creation event includes an object identifier generated by the primary computer application. The method further includes querying the primary computer application for a current state of the object using the object identifier generated by the primary computer application and receiving the current state of the object from the primary computer application. The method also includes generating object data for a secondary computer application independent of the primary computer application based on the current state of the object, and communicating an object creation request to the secondary computer application. The object creation request includes the generated object data. The method further includes receiving an object identifier from the secondary computer application upon creation of the object at the secondary computer application and communicating the object identifier received from the secondary computer application to the primary computer application for storing in a record of the object created at the primary computer application.

Some example embodiments are directed to a system. The system includes a processor and a non-transitory computer readable medium comprising instructions, which when executed by the processor, cause the system to perform the steps of the method described above.

Other example embodiments are directed to non-transitory computer readable medium which when executed by a processor causes the processor to perform the method described above.

BRIEF DESCRIPTION OF THE DRAWINGS

In the drawings:

FIG. 7 is an example screen depicting a user interface for an integrated issue according to aspects of the present disclosure.

FIG. 14 is an example screen depicting a post-mortem record for an integrated issue.

Figure 1:
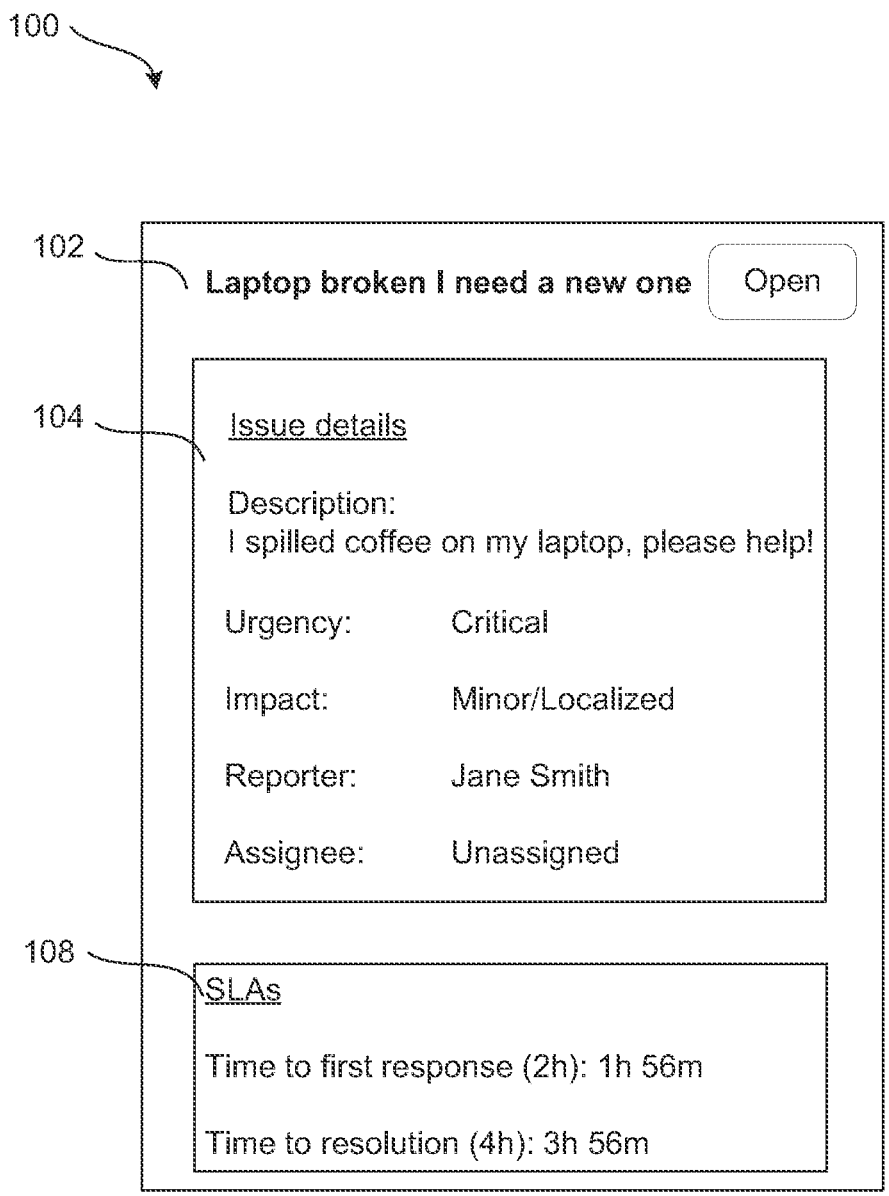
FIG. 1 is an example screen depicting a user interface displayed by a first computer application for an example issue.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, situations may arise where it might be beneficial to incorporate the features of one computer application into another computer application. For example, consider the situation where one computer application is an issue tracking system (ITS) and another computer application is an incident management system (IMS).

Issue tracking systems are systems that manage the creation and tracking of issues or tickets in a variety of contexts. An issue is an item with associated information (e.g., a title and a brief description) and an associated workflow—i.e. a series of states through which the issue transitions over its lifecycle (e.g., pending, assigned, in process, completed).

As one example, an ITS may be deployed for use by a service helpdesk—e.g., an IT service helpdesk in a large organization. A busy service helpdesk may manage thousands, tens of thousands, or even more issues. Each issue may have a different priority, require different actions, be handled by different people, and/or be handled by multiple different people over its lifecycle. An ITS may be used to assist in managing and tracking this process. When a problem is submitted to the helpdesk, an "issue" is created and assigned (at times with a particular priority). As the issue is worked on by various users, the progress of the issue is recorded and tracked by the ITS until, ideally, the issue is resolved and closed.

FIG. 1 illustrates an example user interface 100 displayed by an example ITS system for a particular issue. In this example, the user interface displays a title 102 of the issue (e.g., laptop broken, I need a new one) and issue details 104. The issue details 104, may include a description associated with the issue (e.g., I spilled coffee on my laptop, please help!), a person the issue is assigned to (e.g., unassigned in this example), a person that reported the issue (e.g., Jane Smith in this example), an urgency associated with the issue (e.g., critical), an impact the issue has on multiple users (e.g., minor/localized), etc. Further still, the ITS may provide an associated workflow 106 for each issue—i.e., a series of states through which the issue transitions over its lifecycle (e.g., pending, assigned, in process, completed). These workflows may be customizable. For example, instead of pending, an organization may include the states, "open", and "unassigned" in case the issue is still active and hasn't been assigned to any person as yet, respectively. Further, the ITS may assign service level agreements (SLA) 108 for the issue when it is created (e.g., based on the assigned priority and impact values) and monitor the status of the issue against these SLAs. User interface 100 shows the SLAs 108 for the issue (e.g., 2 hours to first response and 4 hours to resolution in this case).

An IMS may be used to assist in managing and tracking incidents. An incident is an issue that affects multiple users—e.g., an event that has caused disruption to or a reduction in the quality of service of a software application or service to a large number of people. Incidents can vary widely in severity, ranging from an entire global web service crashing to a small number of users having intermittent errors. Incidents often require an emergency response/solution.

Generally speaking, an IMS can be integrated with one or more third party monitoring tools to provide a single interface for dealing with issues/incidents detected by the integrated monitoring tools. IMSs typically include a backend server that is connected to the monitoring tools for receiving notifications from these tools. The server generates and/or manages incidents based on the received notifications. Further, IMSs include a frontend client that provides statuses of the incidents and allows users to manage the incidents. For instance, the front end allows users to perform certain actions on the incidents including, assigning an incident to a specific support engineer, changing a priority level of an incident, deleting an incident, commenting on an incident, creating an incident, etc. In addition to these features, IMSs are also configured to alert relevant support engineers (or responders) when an incident is detected. Further still, certain IMSs may offer video conferencing/real-time meeting services to enhance incident management and collaboration with teammates and/or other teams. For example, the conferencing service may provide video or chat capabilities with an activity stream updated in real-time. One IMS is OpsGenie (offered by Atlassian, Inc.).

Figure 2:
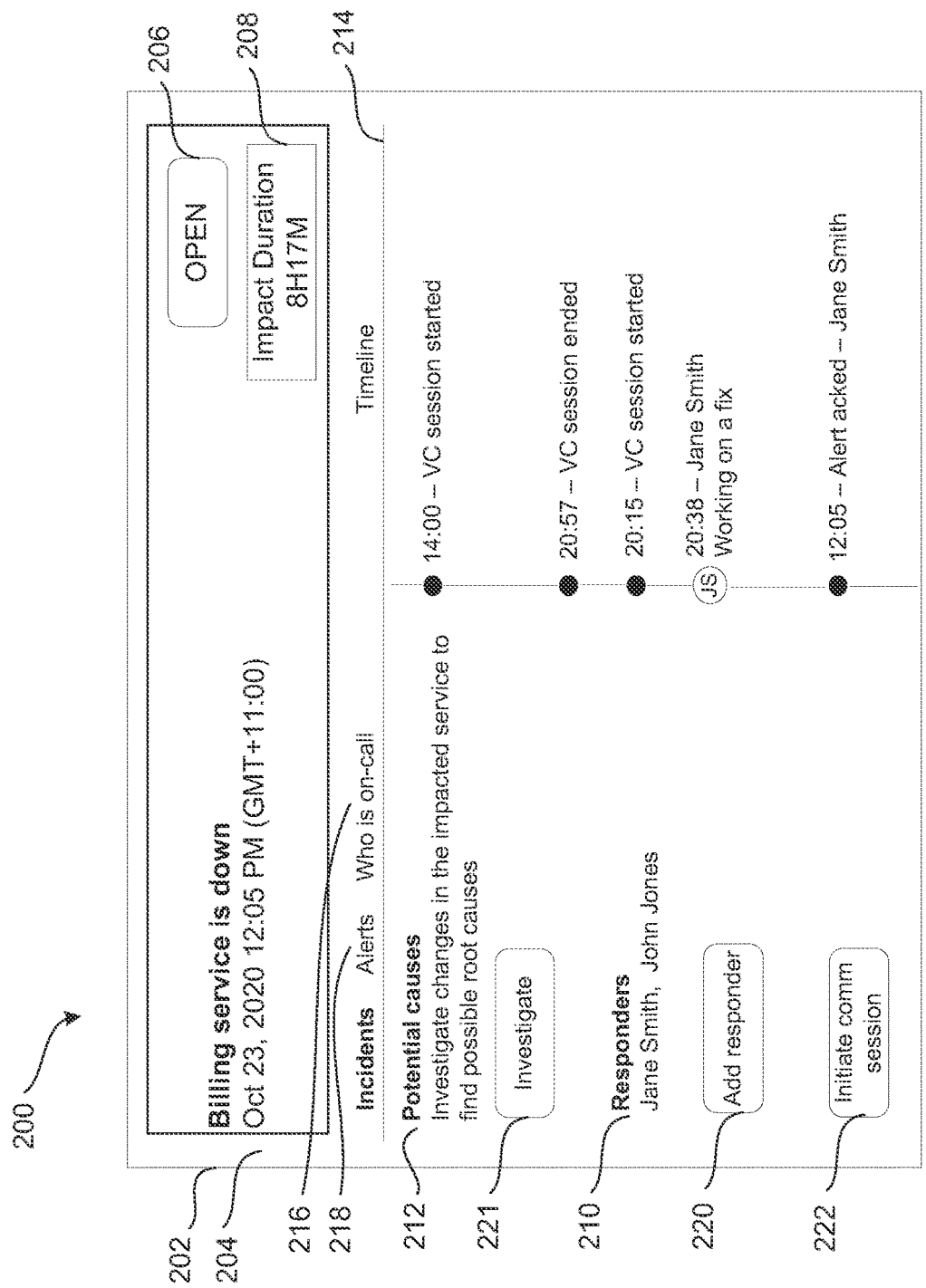
FIG. 2 is an example screen depicting a user interface displayed by a second computer application for an example incident.

FIG. 2 illustrates an example user interface 200 rendered by an example IMS. As shown in this example, the user interface displays a summary 202 of the incident (e.g., Billing service is down), a time the incident was recorded 204 (e.g., Oct. 23, 2020, 12:05 PM (GMIT+11:00), a status of the incident 206 (e.g., Open), impact duration or elapsed time since incident was reported 208 (e.g., 8 H 17 M in this case). Further still, the user interface may display responders 210 associated with the incident, potential causes 212 for the incident, and an incident timeline 214 that shows the actions that have been performed on the incident ever since it was first recorded.

Users may be able to utilize the user interface 200 to manage the incident, e.g., by checking which team members are currently available via the "Who is on-call" tab 216, sending alerts to responders via the "alerts" tab 218, adding responders to the incident using the 'add responder' affordance 220, investigating potential causes using the 'investigate' affordance 221, initiating a communication session with the assigned responders on the incident using the 'initiate communication session' affordance 222, etc.

In some cases, a person may use the ITS system to manage issues, but may require some features offered by the IMS such as the capability to send alerts to one or more responders (e.g., via the alerts tab 218), view call schedules of the responders (e.g., via the who is on-call 216), use the conferencing capabilities offered by the incident management system (e.g., via the initiate communication session affordance 222), etc., while still enjoying the features offered by the ITS system such as the SLAs 108, customized workflows 106 (e.g., status), etc. However, as neither the ITS nor the IMS offers all the functionalities, the user has to often know or guess which platform the user wishes to use for a particular issue/incident, create the right object for it (e.g., issue or incident object) and use the capabilities provided by the selected platform, without being able to enjoy the functionality offered by the other platform.

As discussed previously, it is not only difficult to introduce the features of one computer application in another computer application by developing those features from scratch, it is also very expensive to do so, consumes more computational resources, may take a very long time (sometime years) and may even result in inferior features to those offered by the other computer application.

To overcome some of these issues, aspects of the present disclosure provide an integrated computer application that provides the functionality of two or more independent computer applications. In particular, aspects of the present disclosure provide a unified frontend (i.e., a unified experience for a user) of an integrated computer application, while maintaining the backend systems (i.e., the separate independent server systems) of the two or more computer applications as independent systems. This way, there is no need to replicate the functionalities of a computer application in another computer application or vice versa. Instead, users can interact with a unified frontend, while any requests made by the user in the frontend can be provided to the respective backend applications for fulfillment.

To this end, aspects of the present disclosure assign one of the computer applications as a primary computer application and the other computer applications can be assigned as secondary computer applications. The primary computer application is responsible for providing a unified frontend experience to the user and communicating with the secondary computer applications to update those computer applications based on actions performed by users on the unified front end and also to retrieve services/features offered by the secondary computer applications to present to the user via the unified frontend. In particular, when a user creates a new object in the frontend, a corresponding object is created in each of the primary and secondary computer applications. The unique identifiers of the object in each of the secondary computer applications is stored in the record for the object in the primary computer application. In this way, the primary computer application can use the object identifiers generated by the secondary computer applications to access capabilities offered by the secondary computer application(s) and instruct the secondary computer applications to update corresponding object records.

Aspects of the present disclosure disclose processes for creating new objects, updating these objects in the primary and/or secondary computer applications whenever a user makes any changes in the frontend, and retrieving features/services from secondary computer applications to display in the frontend.

These and other features of the presently disclosed systems and methods will be described in detail in the following sections with reference to FIGS. 3-13. Further, it will be appreciated that features of the presently disclosed systems and methods are described time and again in this disclosure with respect to an ITS as a primary computer application and an IMS as a secondary computer application. In such examples, the object created by the various computer applications is referred to as an integrated issue. However, it will be appreciated that this is merely exemplary and the described systems and methods can just as easily apply when the ITS is the secondary application and the IMS is the primary application. In such examples, the object created by the various computer applications may be referred to as an integrated incident. Further, it will be appreciated that aspects of the present disclosure can be utilized to unify any other two or more computer applications without departing from the scope of the present disclosure.

EXAMPLE SYSTEM

Figure 3:
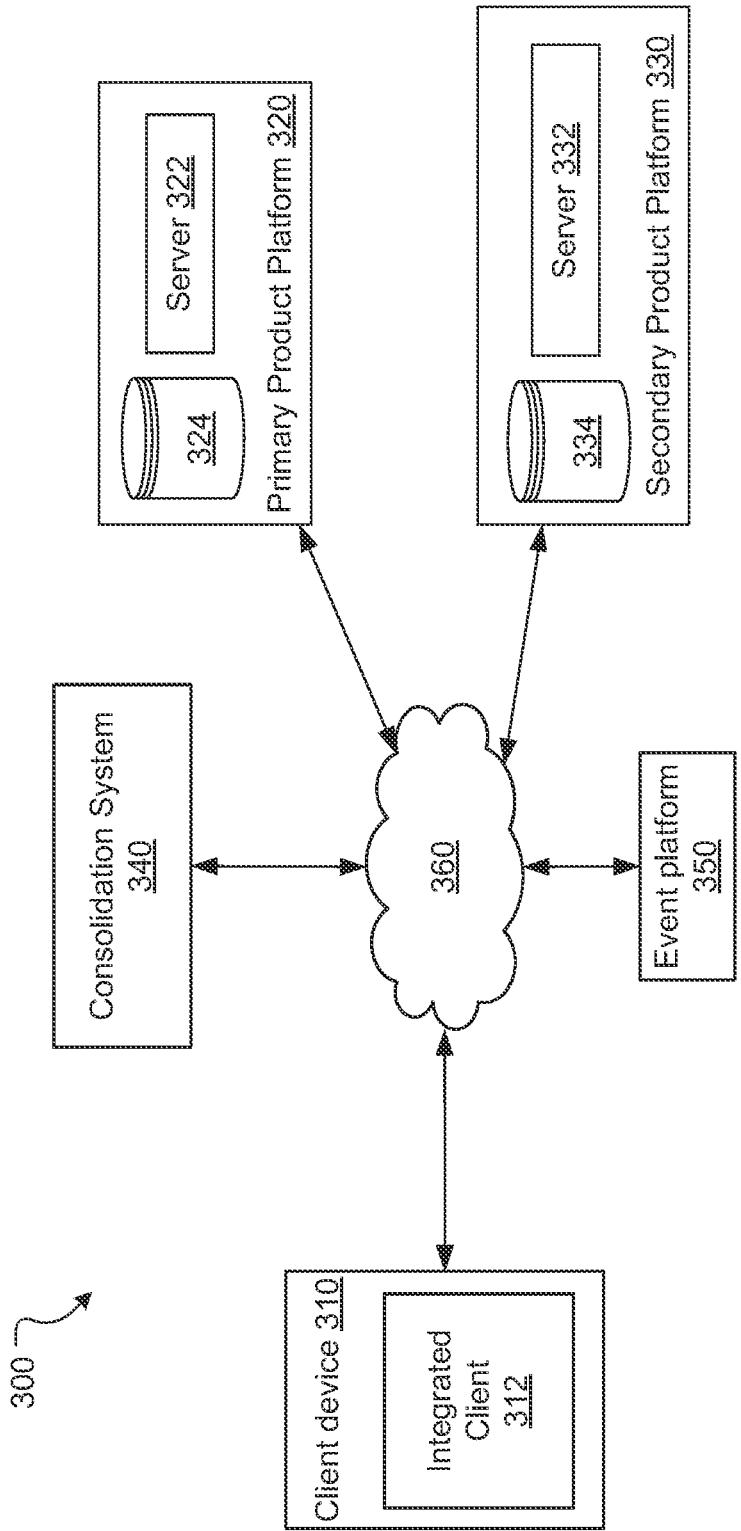
FIG. 3 is a block diagram depicting a networked environment in which various features of the present disclosure may be implemented.

FIG. 3 illustrates an environment 300 in which one or more aspects of the present disclosure are implemented. Specifically, FIG. 3 illustrates the systems involved in integrating two computer applications and providing a unified frontend. The systems include a client device 310, a primary product platform 320, a secondary product platform 330, a consolidation system 340, and an event platform 350. The client device, product platforms, consolidation system, and event platform communicate with each other over one or more communication networks 360.

The client device 310 may be any device suitable for performing client-side operations described herein, for example a mobile device (e.g. a tablet or mobile phone), a portable device (such as laptop computer), or any other computing device (e.g. a desktop computer).

Generally speaking, users of the client device 310 are associated with one or more user accounts and generate and/or communicate electronic content to one or more of the product platforms 320, 330. This activity includes any type of user account interaction with the product platforms 320 or 330, including interaction with content and/or software applications hosted by the product platforms 320, 330. Example interactions include accessing/viewing and/or contributing to one or more issues or incidents hosted by the product platforms, using one or more services offered by the product platforms 320, 330 (such as alerting responders or initiating communication sessions with one or more other responders assigned to an incident), etc.

In order to allow users to perform these functions, as illustrated in FIG. 3, the client device 310 includes one or more client (software) applications (e.g., integration client 312) that is configured to access software applications made available by the product platforms 320 or 330. The integration client 312 may communicate with the software application hosted by the product platforms 320 or 330, render user interfaces based on instructions received from the applications, and receive inputs from user accounts allowing them to interact with the applications hosted by the product platforms 320 or 330. For instance, the integration client 312 may generate and render a unified frontend or user interface (e.g., see FIG. 9) to view integrated objects that are powered by the product platforms 320, 330.

The integration client 312 includes instructions and data stored in the memory (e.g. non-transient compute readable media) of the client device 310 on which the application is installed/run. These instructions are executed by a processor of the client device 310 to perform various functions as described herein. By way of example, some functions performed by the integration client 312 include communicating with a primary application hosted by the primary product platforms 320, 330, rendering user interfaces based on instructions received from the primary application, and receiving inputs from users to interact with content made available by the primary product platform 320. In certain embodiments, where the primary and secondary computer applications are ITS and IMS, respectively, the integration client 312 renders user interfaces that show one or more integrated objects, allow users to create integrated objects, modify integrated objects, assign integrated objects to users, generate alerts, initiate video or chat sessions, etc.

The integration client 312 may be implemented in various ways. For example, the integration client 312 may be a web browser application, which accesses the applications hosted by the product platforms 320 or 330 via appropriate uniform resource locators (URL) and communicates with the platforms via general world-wide-web protocols. In this case, the web browser application is configured to request, render and display user interfaces that conform to a markup language, and may be capable of internally executing browser-executable code, or other forms of code. Alternatively, the integration client 312 may be a specific application programmed to communicate with the product platform 320 or 330 using defined application programming interface (API) calls.

In general, each product platform 320, 330 is a system entity that hosts one or more software applications and/or content. Each product platform 320, 330 may include one or more servers (e.g., 322 and 332) for hosting corresponding software application(s) and one or more storage devices (e.g., databases 324 and 334) for storing application specific data. Examples of software applications hosted by product platforms 320, 330 may include incident management systems (e.g., OpsGenie), software code management system (e.g., Bitbucket), and issue tracking applications (e.g., JIRA). Jira, OpsGenie, and BitBucket are all offered by Atlassian, Inc. It will be appreciated that the software applications need not be offered by the same organization and that the presently disclosed invention can be used with any product platforms 320, 330 configured to interact with the consolidation system 340.

In order to run an ITS, the server 322 includes one or more application programs, libraries, APIs, or other software elements that implement the features and functions of the application. In one example the product server 322 includes an event recording module (not shown) which monitors user account interactions with the product application hosted by the server 322 and forwards event records of each of these user account interactions to the event platform 350 as an event record. In one example, the event recording module communicates integrated object creation events and integrated object update events to the event platform 350. The event recording module may be configured to communicate the event records to the event platform 350 either as a continuous stream or in batches periodically.

The product platforms 320, 330 also store product data. Product data generally includes: data defining the operation of the hosted application (for example, user accounts, user permissions, and the like); and application data (i.e., the content hosted/maintained by the application, which can be, for example, issue data (in an ITS product platform), incident data (in an IMS product platform), or integrated object data (according to aspects of the present disclosure). The data is stored on and managed by database 324, 334. Database 324, 334 may be provided by a database server (not shown) which may be hosted by server 322, 332, but is more typically hosted on a separate physical computer in communication (directly or indirectly via one or more networks 360) with the servers 322, 332. In one example, the databases 324, 334 store integrated object data as shown in database schemas 500 and 600 below.

While single server architecture has been described herein, it will be appreciated that one or both of the product platforms 320, 330 can be implemented using alternative architectures. For example, in certain cases a clustered architecture may be used where multiple server computing instances (or nodes) are instantiated to meet system demand. Conversely, in the case of small enterprises with relatively simple requirements a product platform 320, 330 may be a stand-alone implementation (i.e., a single computer directly accessed/used by the end user).

The consolidation system 340 is configured to act as an intermediary between the primary and secondary product platforms. In particular, the consolidation system 340 requests data/services from secondary product platforms on behalf of the primary product platform or instructs the secondary product platforms to update their respective integrated object data based on behalf of the primary product platform. Further still, the consolidation system 340 is configured to communicate the current/latest state of an integrated object from the primary product platform to the secondary product platforms and communicate integrated object identifiers from the secondary product platforms to the primary product platform (for storage) or vice-versa (to retrieve data). Functionality of the consolidation system 340 will be described in detail with respect to FIGS. 4-13.

The event platform 350 is communicatively coupled to the primary product platform 320 to receive event records from the primary product platform 320 and communicatively coupled to the consolidation system 340 to provide requested event records. In certain embodiments, the event platform 350 is designed based on a publish-subscribe model. That is, the primary product platform 320 sends event records to the event platform 350 and consumers (such as the consolidation system 340) subscribe to the event platform 350 to receive certain type of event data from the event platform, such as event data related to integrated object creation events or integrated object update events. In this model, the publishers categorize the event data into classes without knowledge of which subscribers there may be. Similarly, subscribers express interest in one or more classes of event data and only receive event data from the event platform 350 that is of interest to them. When the event platform 350 receives an event record, the event platform 350 matches the event record with all the subscribers who are subscribed to the event and makes a copy of the event data for each subscriber and stores a copy to the subscriber's queue or stream. In this case, the product platforms 320, 330 may submit event data to the event platform 350 and the consolidation system 340 may subscribe to receive event data related to integrated object creation and/or integrated object update. StreamHub® offered by Atlassian, Inc. is one example of such an event platform 350.

As illustrated in FIG. 3, communications between the various systems 310-350 are via the communication network 360. The communication network 360 is depicted as a single network in FIG. 3 for ease of depiction. However, in actual implementation, the various systems illustrated in FIG. 3 may communicate with each other over different communication networks. For example, the consolidation system 340 may communicate with the product platforms 320, 330 through a local area network (LAN), whereas it may communicate with the client device 310 via a public network (e.g., the Internet). Similarly, the product platforms 320, 330 may communicate with the client device 310 via a LAN or via a public network without departing from the scope of the present disclosure. Furthermore, the consolidation system 340, product platforms 320, 330, and event platform 350 may communicate with each other over open web protocols such as (HTTPS, REST, and JWT).

Although the description above may suggest that the client device 310 and in particular the integration client 312 communicates with either product platform 320, 330, in actual implementation, the integration client 312 is configured to only interact with the primary product platform 320, whereas the primary and secondary product platforms 320, 330 may interact with each other in the background via the consolidation system 340 and/or the event platform 350. In this manner, the user only needs to have a user account with the primary product platform 320 and interact with the primary product platform 320 whilst enjoying the functionalities provided by the secondary product platform 330 as well.

It will be appreciated that although only one client device 310, and one secondary product platform 330 has been depicted, in normal operation, many more client devices 310 and secondary product platforms 330 may be connected to the primary product platform 320 through the network 360.

Further, although the consolidation system 340 is depicted as a standalone system in FIG. 3, this may not be the case. Instead, in some implementations, the consolidation system 340 may be a part of or hosted by the primary product platform 320. In such cases, the consolidation system 340 may be executed by the server system 322 of the primary product platform 320.

The operations/techniques described herein are implemented by one or more special-purpose computing systems or devices. For example, in environment 300: the consolidation system 340 or event platform 350 may be provided by one or more computer systems; the client device 310 is a computer system; and the product servers 322, 332 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 4:
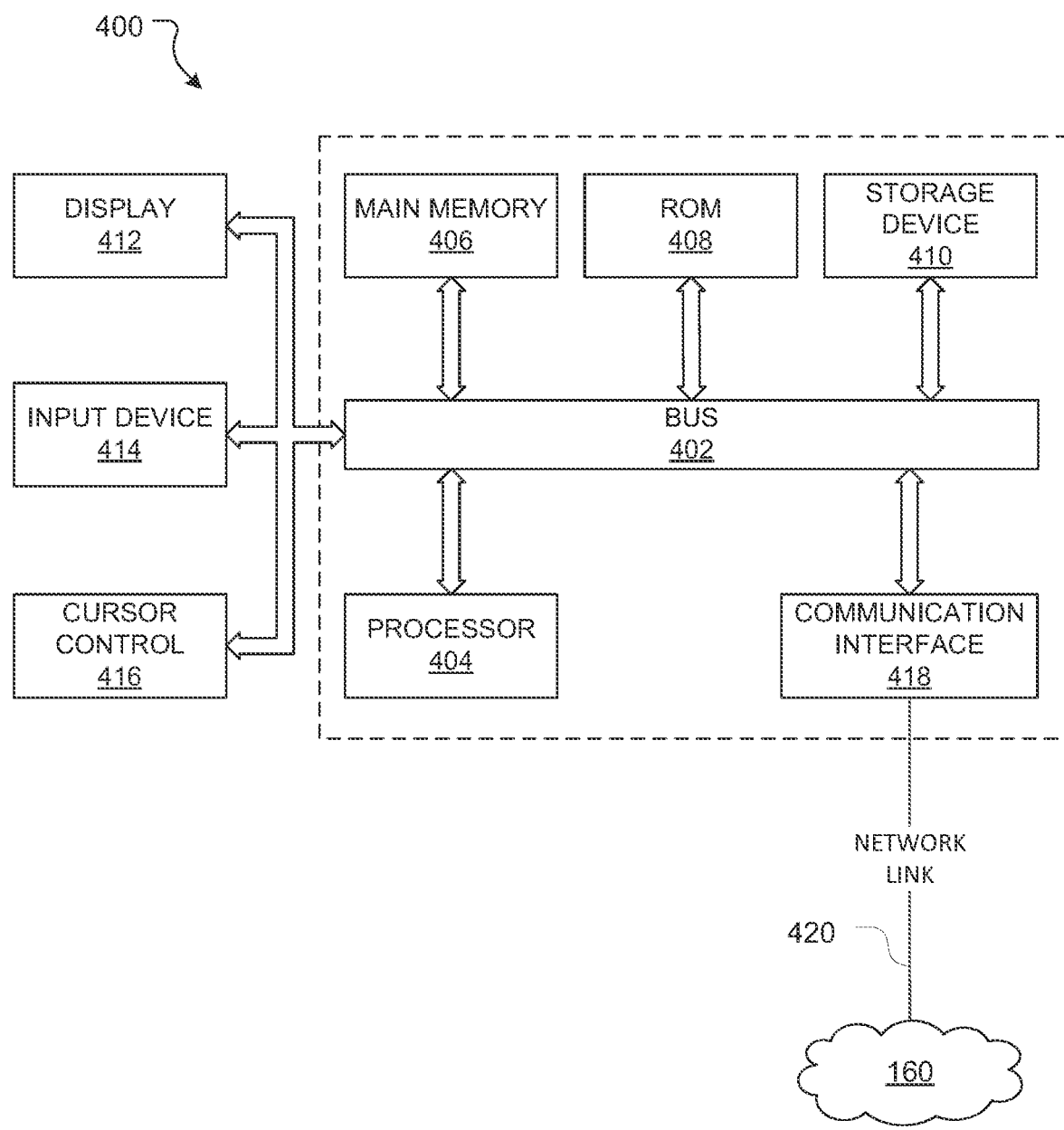
FIG. 4 is a block diagram of a computer processing system configurable to perform various features of the present disclosure.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Processor 404 may be, for example, a microprocessor or other processing device hardware.

Computer system 400 also includes a main memory 406, such as a random access memory (RAM) or other dynamic storage device, coupled to bus 402 for storing information and instructions to be executed by processor 404. Main memory 406 is one example of a non-transitory computer readable media that can be used to store computer-readable instructions for performing one or more of the operations and functions described herein. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. If the computer system 400 is part of the feature system 140, the storage device 410 may store the feature store 144. The ROM 408 and storage device 410 are further examples of non-transitory computer readable media that can be used to store computer-readable instructions for performing one or more of the operations and functions described herein.

In case the computer system 400 is the client device 310, it may be coupled via bus 402 to one more output devices such as a display 412 for displaying information to a computer user. Display 412 may, for example, be a cathode ray tube (CRT), a liquid crystal display (LCD), a light emitting diode (LED display), or other display technology, any one of which may be implemented as a touch screen display. An input device 414, including alphanumeric and other keys, may be coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, hard disk, solid state drive, magnetic tape, or any other magnetic data storage medium, a CD-ROM, any other optical data storage medium, any physical medium with patterns of holes, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to network 360. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks 360 to other computing systems. For example, if the computer system 400 is part of the consolidation system 340, the network link 420 may provide a connection through network 360 to the event platform 350 or the product platforms 320, 330.

Computer system 400 can send messages and receive data, including program code, through the network(s), network link 420 and communication interface 418. In the consolidation system example, it may receive event data through the network 360 and communication interface 418 from the event platform 350.

The processor 404 of the consolidation system 340 may execute the received event data as it is received, and/or store it in storage device 410, or other non-volatile storage for later execution.

ITS and IMS Data Structures and Integrated Issues

This section describes the general manner in which an ITS and incident management system (IMS) is deployed and used.

ITS maintains metadata defining the operation of the ITS. In one embodiment this metadata includes: one or more issue type definitions, each issue type definition defining a field scheme or field configuration for issues of that type (e.g., the possible fields or data to be maintained by the ITS for issues of a given type); one or more workflow definitions, a workflow definition defining the workflow of an issue of a particular issue type (e.g., the states an issue can take and the manner in which an issue transitions between those states over its lifecycle); and user permissions (e.g., which users have permissions to create issues, view issues, amend issues, change the states of issues etc.).

Further, the ITS maintains a list of tickets received by the ITS. For each ticket in the list, the ITS may be configured to store a wide variety of information. By way of one simple example, a ticket may include an issue type definition which may define the following fields: an application/service field storing an application/service associated with the issue; a key field storing a unique identifier for the issue; a title field storing a title of the issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). In this example, the priority field and the rank field store different information. A large number of issues may have the same priority (e.g. critical), however only one issue may have a given rank value. The actual fields defined with respect to an issue type will depend on the requirements of a given ITS implementation, and many other fields are possible.

Figure 5:
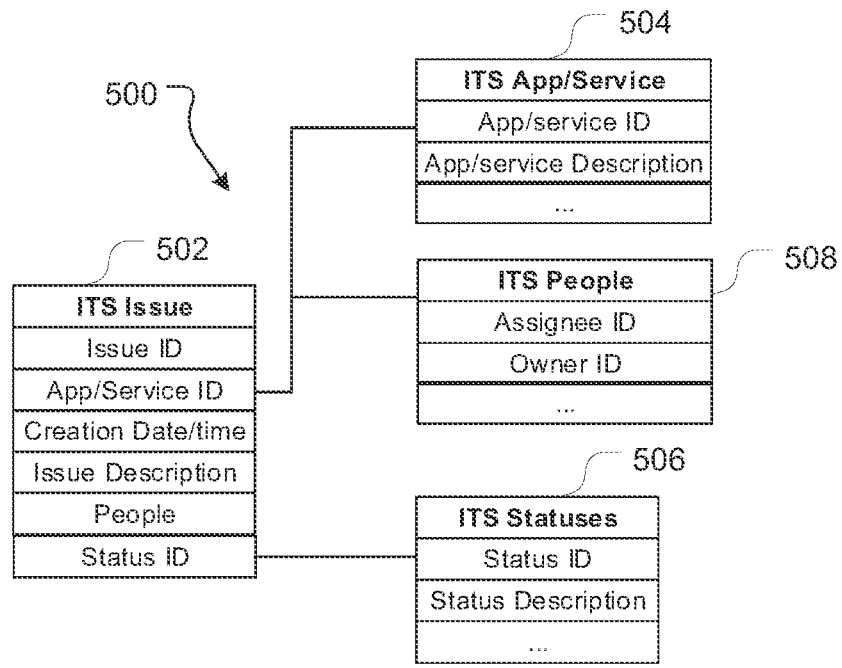
FIG. 5 is a partial example of a simple relational database schema for an ITS.

An ITS may maintain this list of issues in a variety of data structures. In one embodiment, issues are stored in a relational database (e.g., in database 324). By way of illustration, FIG. 5 provides a partial example of a simple relational database schema 500 for an ITS. In this example, schema 500 includes: an issue table 502 comprising an issue ID field, an application/service ID field, a timestamp of when the issue was created, a status ID field, an issue description field; an application/service table 504 comprising an application/service ID field, and an application/service description; a status table 506 comprising a status ID field and a status description field; and a people table 508 comprising an assignee ID field, an owner ID field, and a reporter ID field.

Schema 500 has been provided for descriptive purposes, however a relational database schema for an ITS is typically considerably more complex and can have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. The table below provides an example of a simple single table data structure for storing issues:

TABLE A

Example issue data structure

| Key | App/Service ID | Description | Status | Priority | Date/time | . . . . . . |
|---|---|---|---|---|---|---|

Similarly, the IMS maintains metadata defining the operation of the IMS. In one embodiment this metadata includes: one or more incident type definitions, each incident type definition defining a field scheme or field configuration for incidents of that type (e.g., the possible fields or data to be maintained by the IMS for incidents of a given type) and user permissions (e.g., which users have permissions to create issues, view issues, amend issues, change the states of issues etc.).

Further, the IMS maintains a list of incidents received by the IMS. For each incident in the list, the IMS may be configured to store a wide variety of information. By way of one simple example, a incident may include an incident type definition which may define the following fields: a key field storing a unique identifier for the incident; a summary field storing a summary of the incident; a description field storing a description of the incident; a status field indicating the stage the incident is currently at; a responders field indicating the team or person (if anyone) assigned to the incident; a priority field storing the priority of the incident at a general level (e.g. very high, high, medium, low, very low). The actual fields defined with respect to an incident type will depend on the requirements of a given IMS implementation, and many other fields are possible, such as impacted services affected by the incident.

Figure 6:
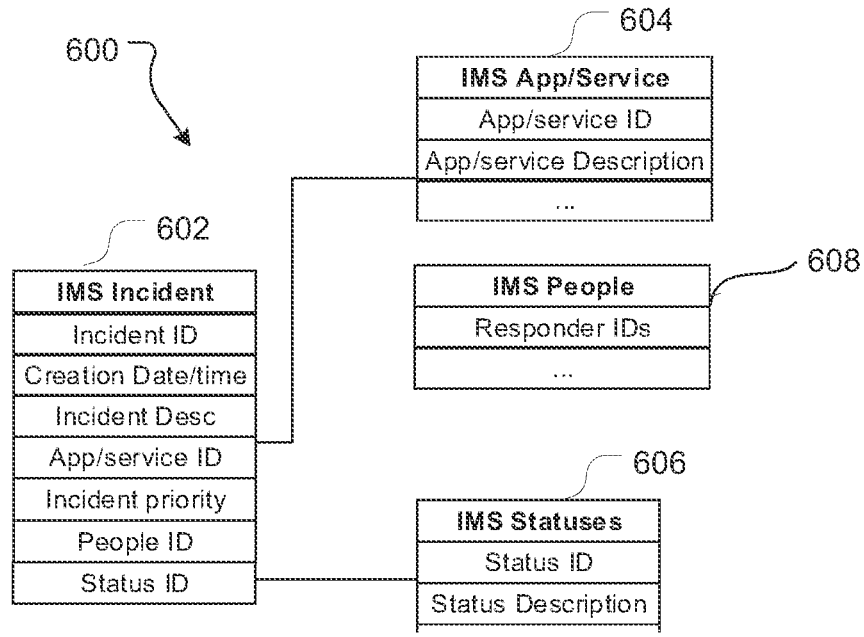
FIG. 6 is a partial example of a simple relational database schema for an IMS.

An IMS may maintain this list of incidents in a variety of data structures. In one embodiment, incidents are stored in a relational database. By way of illustration, FIG. 6 provides a partial example of a simple relational database schema 600 for an IMS. In this example, schema 600 includes: an incident table 602 comprising an incident ID field, a timestamp of when the incident was created, a status ID field, an incident description field; an application/service table 604 comprising an application/service ID field, and an application/service description; a status table 606 comprising a status ID field and a status description field, and a people table 608 comprising identifiers of responder user or teams assigned to the incident.

Schema 600 has been provided for descriptive purposes, however a relational database schema for an IMS is typically considerably more complex and can have additional/different tables with additional/alternative fields and linked in alternative ways. Furthermore, different data structures entirely could, in some cases, be used. For example, incidents could be stored in a single table data structure (which may be appropriate for relatively simple IMSs) where the single table stores all relevant issue data. Table B provides an example of a simple single table data structure for storing issues:

TABLE B

Example incident data structure

| Key | Description | Status | Priority | Date/time | ... | ... |

According to aspects of the present disclosure, the issue data structures and incident data structures may be configured to store data for integrated issues in the data structures described above. As described previously, integrated issues include aspects of issues and incidents. For instance, integrated issues include features/services offered by the ITS such as workflows and SLAs and features/services offered by the IMS such as impact duration, timelines, alerts, communication sessions, etc. When an integrated issue is generated and recorded at the ITS it is called an ITS integrated issue herein and it includes fields similar to a regular issue. When the integrated issue is generated and recorded at the IMS it is called an IMS integrated issue and it includes fields similar to a regular IMS incident.

Further, integrated issues can be distinguished from regular issues or incidents maintained by these systems by adding a 'type' field to all issues and incidents. When an issue or incident is a regular issue or incident the type field can be assigned a "regular" value or the like. Alternatively, when the issue or incident is an integrated issue, the type field can be assigned an "integrated issue" value or the like. This issue or incident type may be communicated by the underlying product platforms 320, 330 whenever the systems communicate event records to the event platform 350. This way, all systems that consume issue or incident events from the event platform 350 can distinguish integrated issues from regular issues or incidents.

Once the ITS platform 320 stores a record of an integrated issue in the database 324, it generates a unique identifier for the integrated issue (also referred to as an ITS identifier herein) and communicates this issue data to the IMS platform 330 to create a corresponding integrated issue record in the IMS platform 330. The IMS platform 330 stores data for an integrated issue in the incident data structure in a similar manner to data for regular incidents. That is, the integrated issues maintained by the IMS platform 330 will have the same fields as regular incidents.

Generally speaking, the ITS may include certain fields that are unique to the ITS and certain fields that have overlap with IMS fields. Similarly, the IMS may include certain fields that are unique to the IMS and other fields that overlap with ITS fields. Accordingly, in some embodiments, when an integrated issue record has to be created at the IMS platform 330 based on an integrated issue data received from the ITS platform 320, a mapping function is performed to convert the overlapping ITS data fields to corresponding IMS data fields. IMS fields that directly correlate to ITS fields can be directly mapped (e.g., the issue description field can be directly mapped to the incident description field). Values of other IMS fields such as priority and status may be mapped from corresponding ITS fields based on predefined rules. Other IMS fields, such as responders, may be automatically populated by the IMS platform 330 based on suitable responders for the incident (identified, e.g., based on the affected service and information about the teams/engineers on on-call for the affected services).

Further, the IMS platform 330 assigns a unique identifier to the created integrated issue (referred to as an IMS identifier herein) and also adds the type field in the integrated issue record to indicate that the record is created based on a corresponding ITS integrated issue. This way the IMS platform 330 can differentiate between integrated issues that are recorded by the IMS platform 330 as a secondary computer application to provide additional functionality to the ITS platform 320 and incidents that are directly created by users of the IMS platform 330 (without any interaction with the ITS system).

In some embodiments, the IMS identifier is returned to the ITS platform 320. The IMS identifier is stored as an issue property in the ITS integrated issue data. The ITS platform 320 can then use this IMS identifier to update the IMS integrated issue as and when required. In another embodiment, instead of storing the IMS identifier in the integrated issue data at the ITS, the ITS identifier and IMS identifier may be stored in the consolidation system 340 (e.g., in a lookup table).

In some embodiments, the ITS platform 320 is configured to retrieve stored data for the integrated issue from the ITS and the IMS platforms 320, 330 and generate a front end user interface for the integrated issue. FIG. 7 illustrates an example user interface 700 for an integrated issue. The user interface 700 includes, for example, the title/description of the integrated issue (e.g., cant' access payroll), and a workflow status (e.g., open). In addition, the user interface 700 shows a summary of the integrated issue (including information about the person that raised the issue and a summary of the issue), a priority level for the integrated issue and the services affected by the integrated issue. Further, the user interface shows SLAs for the integrated issue and a timeline. The user interface 700 also provides a number of interactive affordances to perform certain functions, such as add a responder, initiate a communication session, notify a responder, or link the integrated issue to other integrated issues, regular issues or regular incidents.

A user may interact with this user interface 700 to update the integrated issue (e.g., change status, priority, or affected services; or add/notify a responder, leave a comment, etc.). These changes are then communicated to the underlying ITS and/or IMS platforms to update the integrated issue records in either or both of these platforms (depending on the given update).

Further, the user may interact with this user interface 700 to consume other third party content/features that are available via either the ITS or IMS platforms. For example, the user may join a conference call with other responders on the integrated issue by selecting the initiate communication session affordance on the user interface 700. This affordance may be linked to a URL for a third party meeting application such as Zoom, Teams Meeting, etc. and in particular for a meeting including all the other responders for the given integrated issue. When the user selects the affordance, the corresponding meeting is activated.

Example Methods

Figure 10:
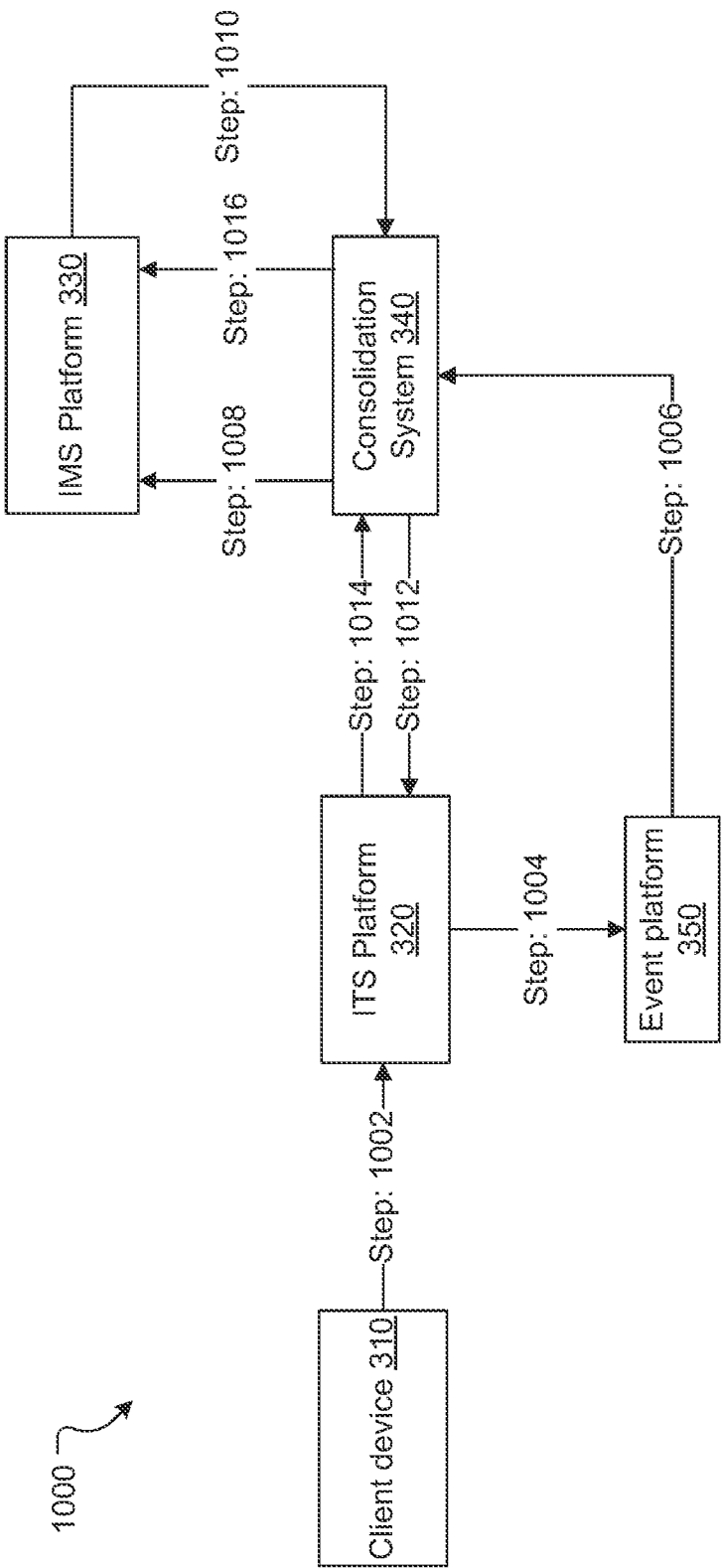
FIG. 10 is a flowchart illustrating an example method for updating an integrated object according to aspects of the present disclosure.
Figure 11:
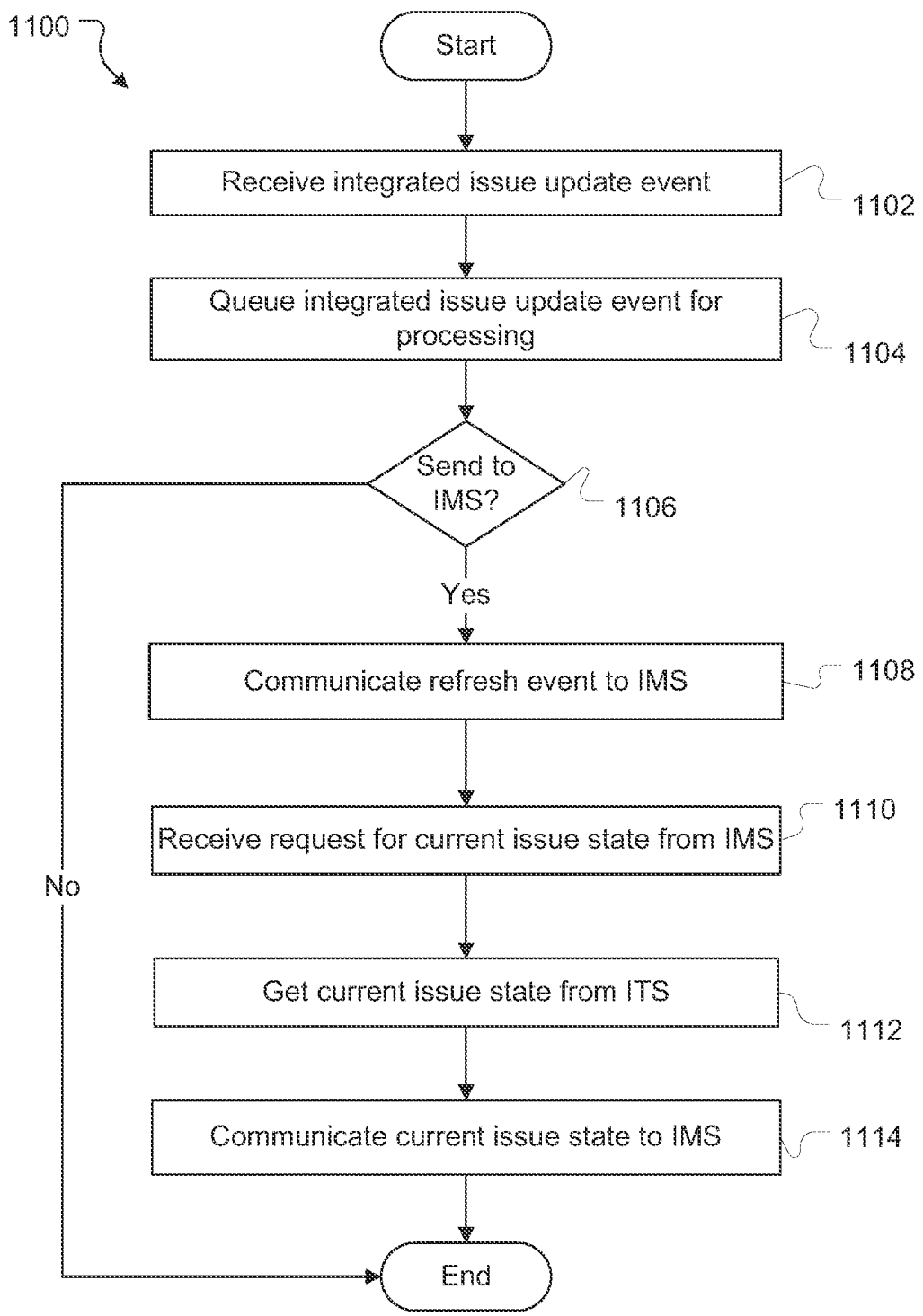
FIG. 11 is a flowchart illustrating an example method performed by the consolidation system to update the integrated object.
Figure 12:
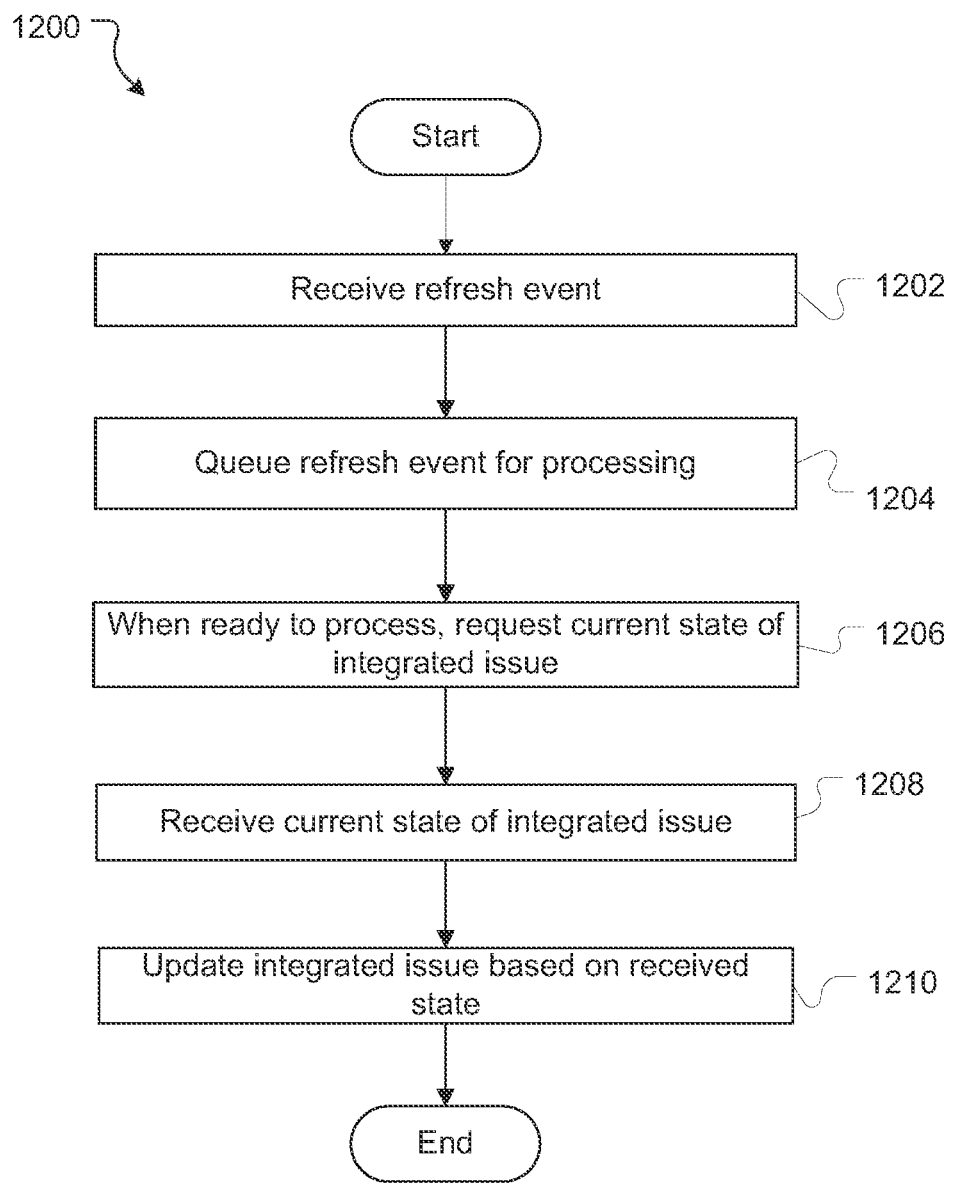
FIG. 12 is a flowchart illustrating an example method performed by a secondary product platform to update the integrated object.

Various methods for providing an integrated front end for independent backend computer applications will now be described. In particular, FIGS. 8 and 9 describe example methods for creating an object in the primary and secondary computer applications. FIGS. 10, 11 and 12 describe methods for updating an object in the primary and the secondary computer application based on a user update made in the frontend, and FIG. 13 describes a method for pulling data from the secondary computer application for rendering the integrated user interface 700.

The operations of the methods described in FIGS. 8-13 will be described as being performed by the systems (e.g., client device 310, primary product platform 320, secondary product platform 330, consolidation system 340, and event platform 350) described in FIG. 1. In alternative embodiments, the processing described may be performed by one or more alternative systems (operating in conjunction with systems 310-350 or independently) and/or alternative applications running on those systems.

Further, the methods disclosed herein will be described with reference to example primary and secondary product platforms. In particular, the primary product platform 320 is considered to be an ITS platform that creates, updates and manages issues and the secondary product platform 330 is considered to be an IMS platform that creates, updates and manages incidents.

Figure 8:
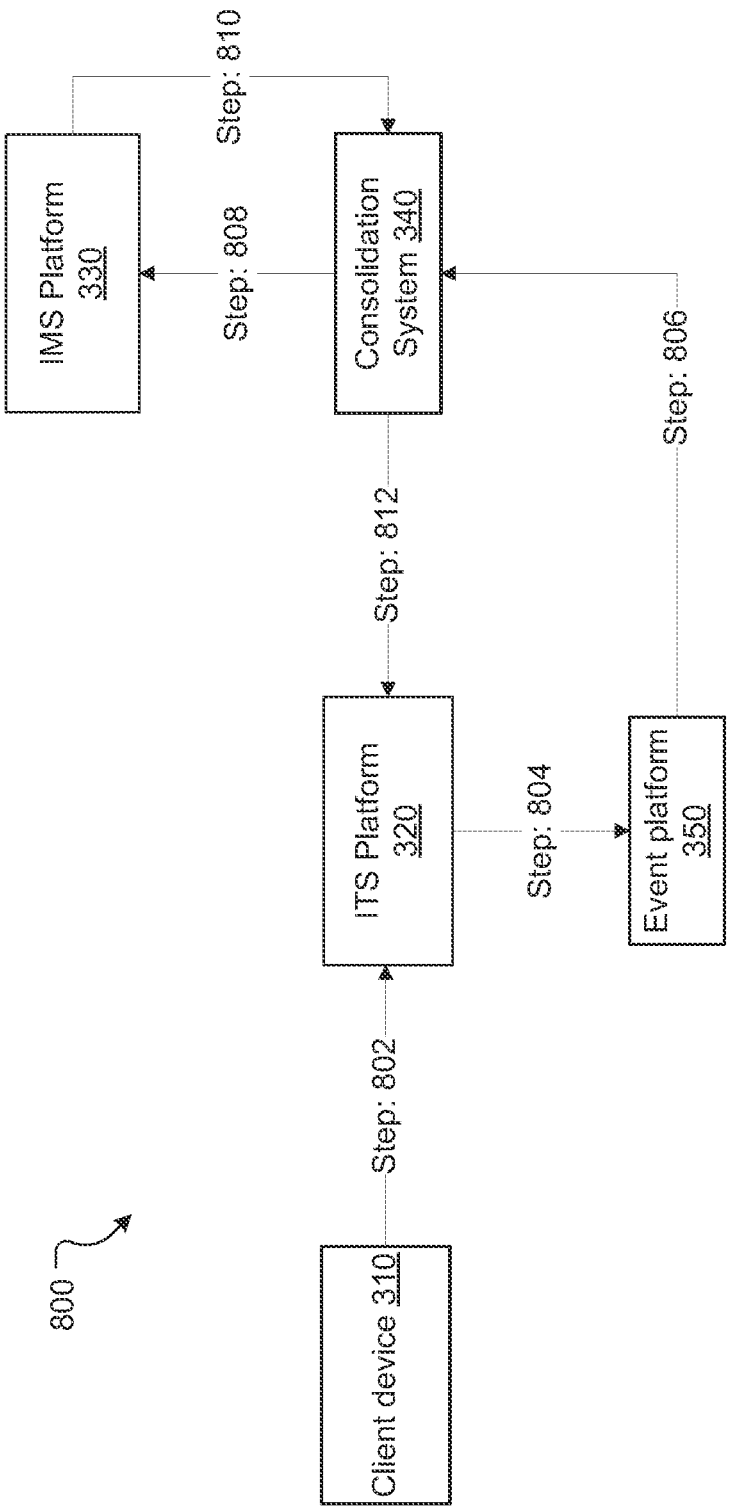
FIG. 8 is a flowchart illustrating an example method for creating an integrated object according to aspects of the present disclosure.

Turning to FIG. 8, method 800 commences at step 802, where the client device 310 communicates an integrated issue creation request to the ITS platform 320. In one example, a user may use the integrated client 312 to access the ITS platform 320. In particular, the user may log into a user account the user has created with the ITS platform 320. Once the user is authenticated, the integrated client 312 may render and display a user interface to the user via which the user may be able to create a new integrated issue. In one example, the user interface may display a selectable affordance, which when selected may render and display an integrated issue creation screen. The integrated issue creation screen may be in the form of an input form including multiple required and optional fields for the user to fill before the integrated issue can be created. Example fields include, e.g., issue title, issue description, issue type, the service or application affected by the issue, etc. In some examples the user may be required to input the answers manually. In other examples, the user interface may provide prepopulated drop-down menus and the user may select the inputs for one or more of the fields from the drop-down menu.

In any case, once the user has provided at least the required information in the integrated issue creation screen, the user may submit the integrated issue creation request, e.g., by selecting a "SUBMIT" affordance on the user interface. Once this is done, the integration client 312 may parse the information input by the user, create a data packet including the input information and corresponding fields and communicate this data packet to the ITS platform 320 at step 702. Before communicating the data packet, the integration client 312 may also include information associated with the user, e.g., a user identifier, a tenant identifier, and/or an identifier associated with the integration client 312.

Next at step 804, the ITS platform 320 creates an issue record based on the received data packet and stores the issue record in the database 324. In one example, the issue record may be stored using the schema described with respect to FIG. 5. In some examples, the data packet may not include data for all the integrated issue fields. For example, the data packet may not include data for the priority field, the status field, or the assignee field. In some cases, the ITS platform 320 may automatically set these values. For example, it may set the status field as a first workflow state (such as open or pending) and may set the priority of the integrated issue based on the affected services field if provided. Alternatively, it may assign default values such as "unassigned" or "undefined" for fields that do not have any values as yet. For instance, it may assign the value "unassigned" to the assignee field. Further, the ITS platform 320 also generates an integrated issue creation event and communicates this event to the event platform 350.

At step 806, the consolidation system 340 consumes the integrated issue creation event from the event platform 350. Generally speaking, the consolidation system 340 may subscribe to all integration issue creation events received at the event platform 350. In particular, the consolidation system 340 may subscribe to receive a subset of the information received as part of the integrated issue creation event at the event platform 350. For example, it may subscribe to receive information that can be used to uniquely identify the integrated issue—such as an integrated issue identifier.

Accordingly, at this step, for all event records received in a particular period of time (e.g., 30 seconds, 60 seconds, 5 minutes), the event platform 350 checks the event record to determine if the consolidation system 340 has subscribed to any of the received event records. If the event platform 350 determines that the consolidation system 340 has subscribed to information in any of the received event records in a given period, the event platform 350 streams the requested data (in case the consolidation system 340 has requested event data to be streamed to the consolidation system 340 as soon as it is received at the event platform 350) or stores the requested data in a queue (in case the consolidation system 340 periodically queries the event platform 350 for batches of event data).

At step 808, the consolidation system 340 generates and forwards an integrated issue creation request to the IMS platform 330. In one example, the integrated issue creation request may include information that uniquely identifies the integrated issue—such as the ITS issue identifier. Further, the request may include integrated issue data that has been mapped to IMS fields such as incident message, incident description, incident priority, incident status, impacted services, responders, etc.

When the IMS platform 330 receives the integrated issue creation request, it creates a record for the integrated issue based on the received integrated issue data. In particular, it uses the mapped integrated issue data received from the consolidation system 340 to add values for corresponding fields in the integrated issue record. If information is not available for one or more fields, the IMS platform 330 may either leave the fields blank, assign default values, or attempt to automatically generate values for such fields. For example, if the responders field of the integrated issue record is empty, the IMS platform 330 may inspect the services impacted field and perform a lookup in the on-call schedules using the impacted services to identify the most suitable person or team to handle the created integrated issue. If the IMS platform 330 identifies such a person or team, it may assign the person/team to the integrated issue (e.g., by recording the person or teams name against the responder field of the integrated issue record and also automatically generate an alert or other form of notification to notify the assigned responders. In addition, the IMS platform 330 assigns an IMS identifier to the generated integrated issue.

At step 810, the IMS platform 330 communicates the IMS identifier to the consolidation system 340. The consolidation system 340 in turn communicates this identifier to the ITS platform 320 along with the ITS issue identifier at step 812. The ITS platform 320 may then inspect its own records to identify the issue (based on the ITS identifier) and store the received IMS identifier as a property of the integrated issue in the database 324.

Figure 9:
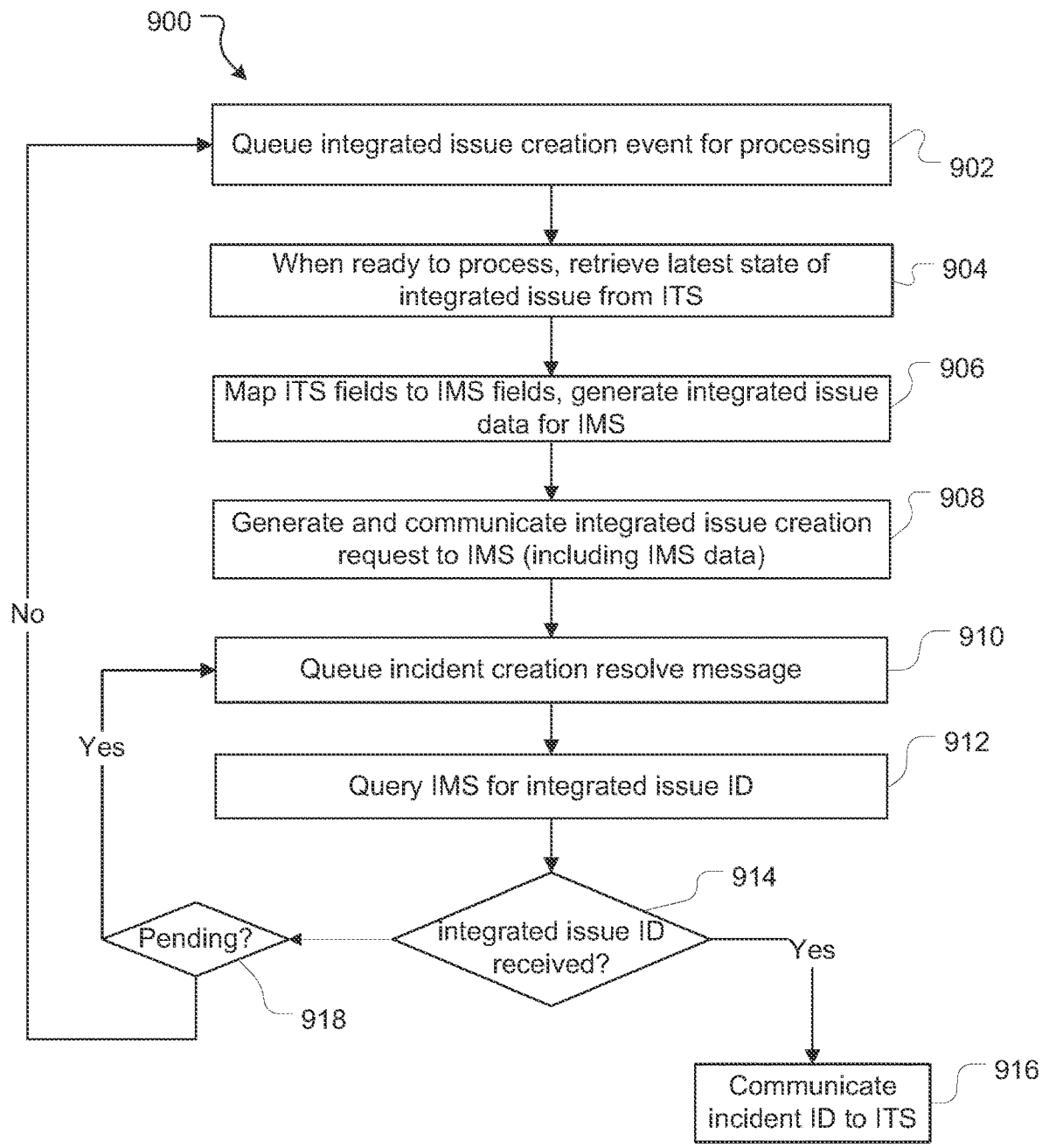
FIG. 9 is a flowchart illustrating an example method performed by the consolidation system for creating the integrated object.

FIG. 9 illustrates an example method 900 performed by the consolidation system 340 after it receives the integrated issue creation event record from the event platform 350 (at step 806) and before it transmits the integrated issue creation request to the IMS platform 330 (at step 808). Further, method 900 includes the steps performed by the consolidation system 340 before it receives the IMS identifier (at step 810).

The method begins at step 902 where the consolidation system 340 receives the integrated issue creation event record. As described previously, the consolidation system 340 may receive issue creation records in a streamed fashion (as and when they are received at the event platform 350) or periodically in a batched fashion. In any event, the received issue creation events are entered in a queue for processing.

At step 904, when the integrated issue creation event record is ready to process (e.g., because all previously queued records have been processed and a processing node of the consolidation system 340 has retrieved the record for processing), the consolidation system 340 retrieves the current state of the integrated issue from the ITS platform 320.

In particular, the consolidation system 340 generates a request for integrated issue data and communicates this request to the ITS platform at step 804. The request includes information to uniquely identify the issue (e.g., the ITS identifier). In one example, the consolidation system 340 may request for a subset of the integrated issue data (e.g., integrated issue data corresponding to fields that overlap between the ITS and IMS platforms), whereas in other examples, it may request the ITS platform 320 to communicate the entire integrated issue record (including integrated issue data corresponding to fields that overlap between the two platforms and integrated issue data corresponding to fields that are unique to the ITS platform 320). The current state of the integrated issue received from the ITS platform 320 may be data in the form of fields and their corresponding values, e.g., field:value pairs.

Next, at step 906, the consolidation system 340 maps fields of the received integrated issue data to fields of the IMS platform 330 to generate integrated issue data suitable for the IMS platform 330. As described previously, the ITS platform 320 stores data specific to issues, e.g., it may store SLAs for a given issue, the services/applications affected by an issue, an issue title, an issue description, issue priority, workflow status, etc. On the other hand, the IMS platform 330 stores data specific to incidents, which may be slightly different to the data stored for issues. For example, it may store impacted services for a given integrated issue as opposed to affected services, responders as opposed to assignees, incident timeline, incident status as opposed to issue status, incident priority as opposed to issue priority, etc. Table C below shows a correspondence between some ITS fields and IMS fields.

TABLE C issue to incident field mapping

| ITS field | Corresponding IMS field |
|---|---|
| Title-a short description of the issue | Message-a summary of the incident |
| Description-a description of the issue | Description-a description of the incident |
| Affected services | Impacted services |
| Priority (highest to lowest) | Priority (critical to informational) |
| Workflow status (ToDo, Progress, done, undefined) | Workflow status (open or resolved) |
| Assignee | Responder |

Accordingly, at step 906, the consolidation system 340 converts the retrieved integrated issue data into data suitable for the IMS platform 330. In particular, the consolidation system 340 maps ITS fields to IMS fields and generates integrated issue data suitable for storing in the IMS platform 330. In certain embodiments, the consolidation system 340 maintains a correspondence between ITS fields and IMS fields (e.g., in a look-up table as shown in Table C above). It can then inspect the lookup table using the ITS fields received as part of the current integrated issue data and determine the corresponding IMS fields.

For example, the consolidation system 340 may retrieve the ITS title field from the current integrated issue data and inspect the lookup table with this field to determine that the corresponding IMS field is a message field. Similarly, it may retrieve the ITS description field from the current integrated issue data and inspect the lookup table with this field to determine that the corresponding IMS field is the description field. Similarly, other ITS fields such as affected services can be mapped with corresponding IMS fields such as impacted services. Once the fields are mapped, their values are mapped. In some examples, values of ITS fields can be directly assigned to corresponding IMS fields. For example, the ITS title field value can be directly assigned as the IMS message field value. Similarly, the ITS description field value and the ITS affected services field values can be directly assigned to IMS description and impacted services field values. Assigning values to other IMS fields may require more complex mapping.

For instance, the ITS priority field may have default values such as HIGHEST, HIGH, MEDIUM, LOW and LOWEST. The corresponding IMS priority field may include values CRITICAL, HIGH, MEDIUM, LOW and INFORMATIONAL. It will be appreciated that these default values are merely exemplary and in practice the values of the ITS and IMS priority fields may be replaced by other customized values depending on a given service desk or IMS application. In one embodiment, the consolidation system 340 maintains a mapping between ITS priority values and IMS priority values (e.g., in a lookup table). In such cases, it may inspect the lookup table based on the ITS priority value to identify the corresponding IMS priority value. Once the corresponding incident priority value is retrieved in this manner it is included in the integrated issue data.

Similarly, the ITS workflow status field may have four categories—TODO, IN PROGRESS, DONE and UNDEFINED, whereas the IMS status field may only have three categories—OPEN, RESOLVED, and CLOSED. In some example IMS platforms, once an incident is marked as closed, the status of the incident cannot be changed. However, for an issue, the ITS platform 320 may allow the status to be changed irrespective of the current status of the issue. Accordingly, in such cases, the consolidation system 340 may map the TODO and INPROGRESS workflow categories to the OPEN category defined by the IMS platform 330 and map the DONE workflow category to the RESOLVED category defined by the IMS platform 330 (by maintaining and inspecting a lookup table as described above).

After the consolidation system 340 maps the ITS fields received as part of integrated issue data to IMS fields and assigns values to the mapped IMS fields, the method 900 proceeds to step 908 where the consolidation system 340 generates and communicates the integrated issue data to the IMS platform 330 as part of the integrated issue creation request. This is similar to step 808 of FIG. 8 and therefore is not described in detail again.

As the IMS platform 330 is independent from the consolidation system 340 and may create the incident record asynchronously (e.g., whenever the IMS platform 330 has available resources to perform the task), the consolidation system 340 may require confirmation from the IMS platform 330 when the integrated issue has been created. Accordingly, the consolidation system 340 waits to receive confirmation from the IMS platform 330 that the integrated issue has been created. In some examples, it performs steps 910 and 912 to achieve this.

In particular, once the IMS platform 330 receives the integrated issue creation request it generates a request identifier associated with the integrated issue creation request and communicates this request identifier back to the consolidation system 340. In some examples, the IMS platform 330 also communicates the issue identifier along with the request identifier at this step.

At step 910, the consolidation system 340 generates a resolve message and queues this message in a resolve queue. The resolve message includes the request ID received from the IMS platform 330 and in some cases the ITS identifier of the issue created at step 802.

When the resolve message reaches the head of the queue, the method proceeds to step 912, where the consolidation system 340 queries the IMS platform 330 for the IMS identifier using the request ID (present in the resolve message).

Next, at step 914, a determination is made whether the IMS identifier is received at the consolidation system 340. If the IMS platform 330 has created the integrated issue by this stage, it communicates a SUCCESS message back to the consolidation system 340 along with the IMS identifier. In this case, the consolidation system 340 determines that it has received the incident identifier and the method proceeds to step 916, where the consolidation system 340 communicates the IMS identifier to the ITS platform 320. This is similar to method step 812 and therefore is not described in detail here.

Alternatively, if the consolidation system 340 determines that it has not received the IMS identifier at this step, the method 900 proceeds to step 918 where the consolidation system 340 determines whether it has received a PENDING message from the IMS platform 330. If at step 918, the consolidation system 340 determines that it is received a PENDING message from the IMS platform 330 (e.g., because the IMS platform 330 has not yet processed the integrated issue creation request), the method proceeds to step 910 where the consolidation system 340 re-queues the resolve message.

Alternatively, if it determines that the message is not a PENDING message, but another message, such as an ERROR message indicating, e.g., that the IMS was unable to create the integrated issue because of network issues or because the task timed out, the method may proceed to step 902, where the consolidation system 340 re-queues the corresponding issue creation event for processing.

In the methods 800 and 900 described above, it is assumed that when an integrated issue is created, a single event is generated by the ITS 320 and/or the event platform 350. However, in some cases, the ITS 320 and/or the event platform 350 may inadvertently generate multiple issue creation events and/or communicate multiple issue creation events for the same integrated issue to the consolidation system 340. In such cases, either the consolidation system 340 or the IMS platform 330 may include mechanism for identifying duplicates and/or preventing the IMS platform 330 from generating and recording multiple incidents for the same ITS identifier. In one case, when the IMS platform 330 receives the integrated issue creation request, it may inspect the its own processing queue to determine whether any other integrated issue creation requests exist in the queue that have the same ITS identifier as the ITS identifier of the currently received integrated issue creation request. If it does find any other such integrated issue creation requests in the queue, the IMS platform 330 may delete the current integrated issue creation request and communicate a FAILURE message to the consolidation system 340. However, the failure message may additionally indicate the reason for the failure—e.g., another incident creation request exists. In such cases, when the consolidation system 340 receives the FAILURE message, instead of re-queuing the message at step 918, the consolidation system 340 may simply delete the resolve message and end method 900 at step 918.

In other cases, the IMS platform 330 may not only inspect the processing queue, but also inspect the IMS integrated issue records to determine if an integrated issue has already been recorded for a given ITS identifier. In this case, the IMS platform 330 also stores the ITS identifier in its database 334 for all created integrated issues. If the IMS platform 330 determines that an integrated issue has already been created and recorded, the IMS platform 330 generates a FAILURE message indicating that the issue has already been created. In such cases as well the consolidation system 340 may simply delete the resolve message upon receiving the FAILURE message from the IMS platform 330.

After the IMS platform 330 creates an integrated issue record, it performs a number of functions and/or generates additional integrated issue data for the integrated issue record. For example, the IMS platform 330 may communicate with a third party meeting application to automatically setup a meeting channel for the responders associated with the recorded integrated issue. Once the third part meeting application has setup a meeting channel, it sends a uniform resource locator (URL) to the meeting to the IMS platform 330, which can save this link in the integrated issue record. Similarly, the IMS platform 330 may identify a list of responders (e.g., based on the impacted services field and the on-call schedule of the teams associated with the impacted services). It may also generate and communicate alerts based on the message field to the identified responders. This information is then stored in the integrated issue record along with other integrated issue data.

FIGS. 10-12 describe example methods 1000-1200 for updating an existing IMS integrated issue when changes are made to the integrated issue at the frontend.

Method 1000 commences at step 1002, where the client device 310 communicates an integrated issue update event to the ITS platform 320. In one example, a user may use the integrated client 312 to access the ITS platform 320. In particular, the user may log into a user account the user has created with the ITS platform 320. Once the user is authenticated, the integrated client 312 may render and display a user interface to the user via which the user may be able to view and/or modify one or more issues the user has permission to view/modify. For example, the user may view an existing integrated issue using a user interface, such as user interface 700 as shown in FIG. 7, and may perform one or more actions with respect to the integrated issue. For example, the user may add a responder to the integrated issue, change a status of the issue, change a priority level, leave a comment, request to initiate a communication session with all the responders assigned to the integrated issue, edit the timeline, etc.

When the user performs any one of these actions or any other actions on the integrated issue, the integrated client 312 generates an update event and communicates this update event to the ITS 320. The update event may include information identifying the issue (e.g., tenant identifier and ITS issue identifier), information identifying the user that made the update (e.g., a user identifier, a tenant identifier, and/or an identifier associated with the integrated client 312), information identifying the updated field(s), and the corresponding updated value(s).

Next at step 1004, the ITS platform 320 updates the issue record based on the received issue update event. It will be appreciated that the ITS platform 320 performs an update if it determines that one or more of the updated fields are ITS fields. Alternatively, if it determines that none of the updated fields are ITS fields, it does not update the ITS issue record. Instead, it simply communicates the integrated issue update event to the event platform 350. In addition to the information mentioned above, the issue update event may include the issue type field.

At step 1006, the consolidation system 340 consumes the integrated issue update event from the event platform 350. Generally speaking, the consolidation system 340 may subscribe for all update events received at the event platform 350 for integrated issues. Accordingly, at this step, for all issue update records received in a particular period of time (e.g., 30 seconds, 60 seconds, 5 minutes), the event platform 350 checks whether the issue update event corresponds to an integrated issue (e.g., by examining the issue type field of the event). If the event platform 350 determines that one or more of the events are update events for integrated issues, the event platform 350 streams the identified event records (in case the consolidation system 340 has requested event data to be streamed to the consolidation system 340 as soon as it is received at the event platform 350) or stores the requested data in a queue (in case the consolidation system 340 periodically queries the event platform 350 for batches of event data).

At step 1008, the consolidation system 340 generates and forwards a refresh event to the IMS platform 330 based on the received integrated issue update event. In one example, the refresh event may include information that uniquely identifies the integrated issue—such as the ITS identifier and the IMS identifier. Further, in some examples, the request may include information about the IMS fields that need to be updated. In other examples, information about the IMS fields may not be included in the refresh events. Instead, refresh events may simply include a request to refresh a given incident along with information identifying the integrated issue. An example of a refresh event is provided below

```
{
    "type": "refreshintegratedissue ",
    "resource": "ari:cloud:consolidationsystem:<cloud_id>:IMS-integratedissue /<IMS-integratedissue-id>",
    "payload": {
        "activationId": "<activation-id>",
        "actorAccountId": "<account-id>"
    }
}
```

As seen in this example, the refresh event includes the identifier of the incident that needs to be updated (IMS-integratedissue-id), the identifier of the tenant to which the incident belongs (activation-id), and an identifier of the user that made the update on client device 310 (account-id).

When the IMS platform 330 receives the refresh request, it requests the current/latest state of the integrated issue from the ITS platform 320. In one example, the IMS platform 330 may communicate the request to the consolidation system 340 at step 1010, which communicates the request to the ITS platform 320 at step 1012.

At step 1014, the ITS platform 320 returns the updated state of the integrated issue to the consolidation system 340, which communicates the updated state to the IMS platform 330 at step 1016.

At step 1018, the IMS platform 330 updates values of the corresponding incident as required.

Method 1100 is performed by the consolidation system 340 and commences at step 1102 where the consolidation system 340 receives an issue update event from the event platform 350.

At step 1104, the received issue update event is queued. As described previously, the consolidation system 340 may receive issue update records in a streamed fashion (as and when they are received at the event platform 350) or periodically in a batched fashion. In any event, the received issue update events are entered in a queue for processing.

When a queued issue update event record is ready to process (e.g., because all previously queued records have been processed and a processing node of the consolidation system 340 is available to process the next record), the consolidation system 340 retrieves the IMS identifier corresponding to the ITS identifier provided in the issue update event record from the ITS platform 320. In one example, it queries the ITS platform 320 for the IMS identifier using a simple GET request. The ITS platform 320 retrieves the IMS identifier from the corresponding issue data record. At this step, the consolidation system 340 also determines whether a refresh event should be generated for the given issue update event.

As described previously, some fields of an integrated issue may be stored in the ITS platform 320 whereas other fields of the integrated issue may be stored in the IMS platform 330. If a given issue update event corresponds to fields that are recorded at the ITS platform 320, there may be no need to send such an issue update event to the IMS platform 330 as none of the updated fields are recorded or controlled by the IMS platform 330.

Accordingly, at step 1106, the consolidation system 340 inspects the updated fields in the issue update event to determine whether any of the updated fields are maintained by the IMS platform 330. In one example, the consolidation system 340 may maintain a lookup table of all the integrated issue fields managed by the IMS platform 330 and at step 1106 it may inspect this lookup table to check if any of the updated fields in the issue update event are present in the lookup table. If a determination is made that one or more of the updated fields of the issue update event are present in the lookup table, the consolidation system 340 determines that a refresh request should be sent to the IMS platform 330 and the method proceeds to step 1108.

At step 1108, the consolidation system 340 generates and communicates the refresh event to the IMS platform 330. This is similar to step 1008 and therefore is not described in detail again.

At step 1110, the consolidation system 340 receives a request from the IMS platform 330 to retrieve the current state of a given integrated from the ITS platform 320. The request includes information to identify the integrated issue (e.g., the issue identifier, account identifier and tenant identifier). At step 1112 the consolidation system 340 gets the current integrated issue state from the ITS platform 320. In one example, it may be a simple GET request including issue identification information.

At step 1114, the consolidation system 340 maps and converts the received ITS integrated issue data to IMS integrated issue data and communicates this to the IMS platform 330. In one example, the mapping may be done in a similar fashion to that described with respect to method step 906 of FIG. 9 and therefore this is not described here again in detail.

FIG. 12 describes an example method 1200 performed by the IMS platform 330 to update an integrated issue record. The method 1200 commences at step 1202, where the IMS platform 330 receives a refresh event from the consolidation system 340.

At step 1204, the IMS platform 330 queues the refresh event for processing. In one example, the queue may be a simple FIFO queue. Processing nodes of the IMS platform 330 retrieve refresh events from the queue, process the events, and then retrieve the next refresh events from the queue. This process repeats until the queue it empty and resumes when new refresh events are queued.

When a processing node of the IMS platform 330 retrieves the refresh event queued at step 1204 from the queue, the method proceeds to step 1206 where the IMS platform 330 generates a request for the current state of the integrated issue based on the refresh event. In particular, the IMS platform 330 utilizes the ITS identifier provided as part of the refresh event to generate the integrated issue state request. This request is communicated to the consolidation system 340 at this step.

Next, once the IMS platform 330 receives the current state of the integrated issue (at step 1208), it updates the integrated issue record (at step 1210). The current state of the integrated issue includes updated fields and their corresponding values. In one example, the IMS platform 330 may compare the values of the fields received as part of the current state of the integrated issue with the values of the corresponding fields stored in the IMS platform to determine the fields of the integrated issue that have been updated since the integrated issue record was last saved. The fields of the integrated issue that are identified has having been changed, are then updated. This way, the IMS platform 330 does not have to update the entire integrated issue record. Instead, it may update only the fields that require updating. Alternatively, the IMS platform 330 may not perform this comparison. Instead, it may update the entire integrated issue based on the updated state received at step 1208.

In FIGS. 10-12 it is assumed that the IMS platform 330 cannot communicate directly with the ITS platform 320 and has to communicate via the consolidation system 340. However, this might not always be the case. In some embodiments, the IMS platform 330 and the ITS platform 320 may be configured to communicate directly. In such cases, the IMS platform 330 may directly request the ITS platform 320 to provide the current state of an issue and either the ITS platform 320 or the IMS platform 330 may perform the ITS field to IMS field mapping.

Further still, in FIGS. 10-12 it is assumed that the integrated issue update event is generated after the integrated issue has been created by the IMS platform 330. However, this might not always be the case. In some cases, an integrated issue may be updated immediately after it has been created and the integrated issue update event may reach the consolidation system 340 at about the same time as the integrated issue creation event. In such cases, the consolidation system 340 may be at step 1106 before the ITS platform 320 can store the IMS identifier for the corresponding IMS integrated issue.

Accordingly, in some cases, at step 1106, when the consolidation system 340 queries the ITS platform 320 for the IMS identifier, the ITS platform 320 may not be able to return an IMS identifier value (e.g., because it has not yet received the IMS identifier from the IMS platform 330). In such cases, the consolidation system 340 may be configured to retry step 1106 a number of times (e.g., 3 times with 100 ms back-off between retries). If it is unable to obtain the IMS identifier after repeated attempts, the consolidation system 340 may put the corresponding integrated issue update event back in the processing queue and the method may proceed to step 1104.

Figure 13:
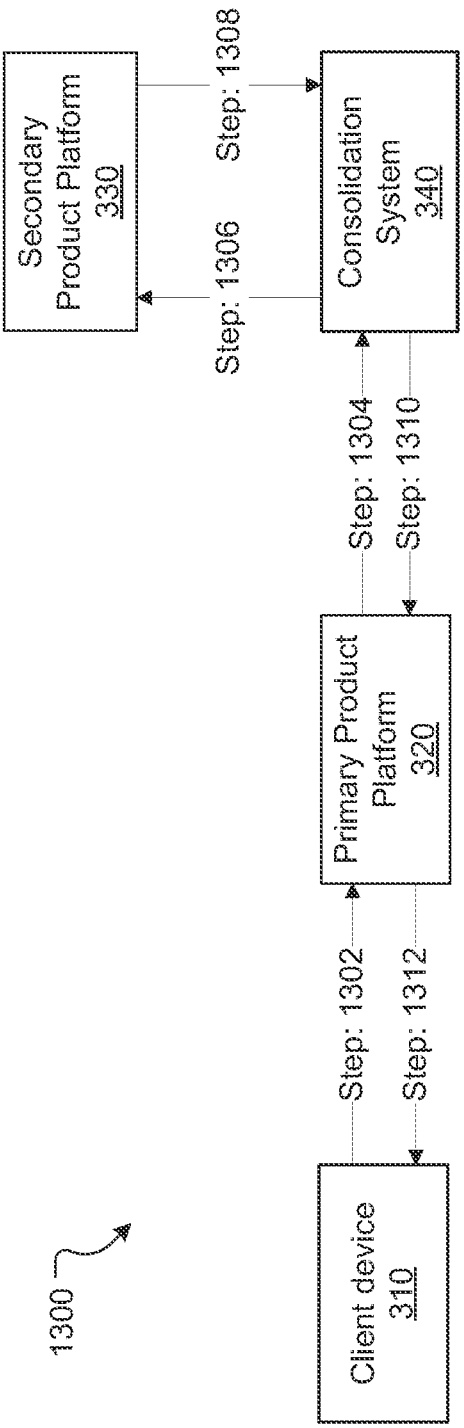
FIG. 13 is a flowchart illustrating an example method for retrieving one or more services or records from a secondary product platform in response to a user request.

FIG. 13 illustrates an example method 1300 for providing a feature/service offered by the secondary product platform on a user interface displayed on the client device 310.

The method 1300 commences at step 1302 where the client device 310 communicates a request for a service to the ITS platform 320. In one example, a user may be viewing an integrated issue on a user interface (such as user interface 700) displayed on the client device 310 and the user may select a service offered by the IMS platform 330. For example, the user may select a 'postmortem' service or may select the 'initiate communication session' affordance displayed on user interface 700. A postmortem is a written record of an incident that contains information such as incident impact, mitigation steps, root cause, and follow-up actions. The aim of a postmortem record may be to understand all root causes, document the incident for future reference, discover patterns, and enact effective preventative actions to reduce the impact or likelihood of recurrence.

In case any such service/record offered by the IMS platform 330 is selected, the integrated client 312 generates a request for the service/record and communicates this request to the ITS platform 320. The request may include the identifier of the requested service, the ITS identifier of the integrated issue, and information that uniquely identifies the user that makes the request.

At step 1304, the ITS platform 320 inspects the request and determines whether it can service the request. For example, the ITS platform 320 may inspect the identifier of the requested service to determine if the identifier corresponds to any service/record offered by the ITS platform 320. If it determines that the identifier corresponds to a service/record offered by the ITS platform 320, it may retrieve data associated with the service/record from the issue database 324 and communicate this to the client device 310 for rendering in the user interface 700.

Alternatively, if the ITS platform 320 determines that it cannot service the request, the ITS platform 320 communicates the request to the consolidation system 340. However, before doing so, it may retrieve the IMS identifier corresponding to the ITS identifier provided in the request and append the IMS identifier to the service request.

At step 1306, the consolidation system 340 requests the IMS platform 330 to provide data for the requested service/record. In one example, the request communicated by the consolidation system 340 to the IMS platform 330 includes the IMS identifier, identifier of the user that requested the service, and an identifier of the requested service/record.

Upon receiving the request, the IMS platform 330 retrieves the requested data, e.g., based on the IMS identifier and service identifier received from consolidation system 340 and communicates the requested data to the consolidation system at step 1308. For example, if a postmortem record for a given integrated issue is requested, the IMS platform 330 may retrieve data corresponding to the postmortem record for the given integrated issue and communicate this to the consolidation system 340. In some cases if the postmortem has not yet been done, the IMS platform 330 may communicate the postmortem fields and corresponding default/description values at this stage.

Next, the consolidation system 340 communicates the received service/record data to the ITS platform 1310. The ITS platform 320 may then communicate the data to the client device 310 to be displayed in the user interface 700 for the user to interact with. For example, if the requested service/record was a postmortem record, the user device may display a user interface as shown in FIG. 14.

In some cases, the ITS platform 320 and the IMS platform 330 may also be utilized as standalone computer applications. In such cases, the ITS platform 320 may generate regular issues (without invoking any of methods 800-1300) and the IMS platform 330 may similarly generate regular incidents. Further, the integrated issue records maintained by the ITS and/or IMS platforms 330 may be marked as integrated issues and are not returned to users of the standalone applications. To such users, integrated issues are hidden and are not displayed as part of any search. Further, even if users of the standalone ITS and/or IMS platforms search for specific integrates issues, the corresponding computer applications may generate and display error messages.

The following numbered clauses describe additional, specific embodiments of the disclosure:

Clause 1: A computer-implemented method, comprising: receiving an object creation event in respect of an object created at a primary computer application, wherein the object creation event including an object identifier generated by the primary computer application; querying the primary computer application for the current state of the object using the object identifier generated by the primary computer application; receiving the current state of the object from the primary computer application; generating object data for a secondary computer application independent of the primary computer application based on the current state of the object; communicating an object creation request to the secondary computer application, the object creation request comprising the generated object data; receiving an object identifier from the secondary computer application upon creation of the object at the secondary computer application; and communicating the object identifier received from the secondary computer application to the primary computer application for storing in a record of the object created at the primary computer application.

Clause 2: The computer-implemented method of clause 1, wherein the current state of the object comprising one or more fields of the object maintained by the primary computer application the their corresponding values.

Clause 3: The computer-implemented method of clause 2, further comprising: mapping the one or more fields of the object maintained by the primary computer application to one or more fields maintained by the secondary computer application.

Clause 4: The computer-implemented method of clause 3, wherein generating the object data for the secondary computer application is based on the mapping between the one or more fields of the object maintained by the primary computer application and the one or more fields maintained by the secondary computer application.

Clause 5: The computer-implemented method of clause 3, wherein mapping the one or more fields maintained by the primary computer application to the one or more fields maintained by the secondary computer application includes maintaining a lookup table comprising correspondence between the one or more fields maintained by the primary computer application and the one or more fields maintained by the secondary computer application; and for a given field in the current state received from the primary computer application inspecting the lookup table to identify the corresponding field maintained by the secondary computer application.

Clause 6: The computer-implemented method of clause 4, wherein generating object data for the secondary computer application based on the mapping comprises: maintaining a lookup table comprising possible values of at least a subset of fields of the one or more fields maintained by the primary computer application and possible values of the corresponding fields maintained by the secondary computer application; and inspecting the lookup table with a value of a field of the subset of fields to retrieve a corresponding value of the corresponding field maintained by the secondary computer application.

Clause 7: The computer-implemented method of clause 1, further comprising receiving a request identifier associated with the object creation request from the secondary computer application.

Clause 8: The computer-implemented method of clause 7, further comprising querying the secondary computer application for the object identifier using the request identifier.

Clause 9: The computer-implemented method of clause 1, further comprising: queuing the object creation event and retrieving the current state of the object when the object creation event is ready to be processed.

Clause 10: The computer-implemented method of clause 1 wherein the primary computer application is an issue tracking system and the secondary computer application is an incident management system.

Clause 11: A computer-implemented method comprising: receiving an object update event in respect of an object updated at a user device, wherein the object update event including an object identifier generated by the primary computer application; retrieving an object identifier generated by a secondary computer application from the primary computer application; communicating a refresh event to a secondary computer application, the refresh event comprising the object identifier generated by the secondary computer application; receiving request for current object data for the object from the secondary computer application; retrieving the current state of the object from the primary computer application, the current state comprising one or more fields maintained by the primary computer application and their corresponding values; mapping the one or more fields maintained by the primary computer application to one or more fields maintained by the secondary computer application; generating object data for the secondary computer application based on the mapping; communicating the generated object data to the secondary computer application for updating a record of the object maintained by the secondary computer application.

Clause 12: The computer-implemented method of clause 9 further comprising determining whether to communicate the refresh event to the secondary computer application.

Clause 13: The computer-implemented method of clause 10, wherein determining whether to communicate the refresh event to the secondary computer application comprises: inspecting one or more fields of the object that have been updated and determining whether the one or more fields have corresponding fields maintained by the secondary computer application or are fields maintained by the secondary computer application.

Clause 14: The computer-implemented method of clause 9, wherein mapping the one or more fields maintained by the primary computer application to the one or more fields maintained by the secondary computer application includes maintaining a lookup table comprising correspondence between the one or more fields maintained by the primary computer application and the one or more fields maintained by the secondary computer application; for a given field received from the primary computer application inspecting the lookup table to identify the corresponding field maintained by the secondary computer application.

Clause 15: The computer-implemented method of clause 9, wherein generating object data for the secondary computer application based on the mapping comprises: maintaining a lookup table comprising possible values of at least a subset of the one or more fields maintained by the primary computer application and possible values of the corresponding fields maintained by the secondary computer application; and inspecting the lookup table with a value of a field of the subset of fields to retrieve a corresponding value of the corresponding field maintained by the secondary computer application.

Clause 16: The computer-implemented method of clause 9, further comprising: queuing the object update event and generating the refresh event for the object when the object update event is ready to be processed.

Clause 17: The computer-implemented method of clause 9 wherein the primary computer application is an issue tracking system and the secondary computer application is an incident management system.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method, comprising:
   receiving, at a backend of a first product platform, a first request for creation of a first object, the first request received from a client application executing on a client device;
   in response to receiving the first request, creating a first object at the first product platform, the first object including first object data;
   subsequent to the creation of the first object, causing creation of a second object at a second product platform, the second object corresponding to the first object;
   in response to the creation of the second object at the second product platform, receiving an object identifier from the second product platform;
   storing the object identifier in association with the first object;
   in response to a service request from the client device operated by a user for a service offered by the second product platform, communicating the service request and the object identifier to the second product platform; and
   receiving data associated with the service from the second product platform.

2. The computer-implemented method of claim 1, wherein the causing the creation of the second object at the second product platform further comprises:
   generating second object data for the second product platform, based on the first object data; and
   communicating a second request to the second product platform for the creation of the second object, the second request including the generated second object data.

3. The computer-implemented method of claim 1, further comprising:
   in response to receiving the service request, retrieving the object identifier of the second object; and
   communicating the service request to the second product platform by transmitting an application programming interface call that includes the object identifier.

4. The computer-implemented method of claim 1, wherein the service comprises one or more of: assigning the first object to a responder, generating an alert related to the first object, providing a service status of the first object, providing a commentary, or initiating a communication session between the user and a responder of the first object.

5. The computer-implemented method of claim 1, further comprising generating an event indicating provision of the service to the object.

6. The computer-implemented method of claim 1, wherein the first product platform is an issue tracking system.

7. The computer-implemented method of claim 1, wherein the second product platform is an incident management system.

8. A computer-implemented method, comprising:
receiving, at a backend of a first product platform, a first request to update a first object in the first product platform, the first request received from a client application executing on a client device and including a first object identifier and updated information associated with the first object;
in response to receiving the first request, identifying the first object using the first object identifier;
updating the first object based on the updated information associated with the first object;
in accordance with a successful update of the first object, communicating a second request to a second product platform to update a second object stored therein that corresponds to the first object, the second request including a second object identifier identifying the second object;
receiving, from the second product platform, a third request for a current state of the first object;
in response to receiving the third request, determining the current state of the first object using the first object identifier; and
transmitting object data including the current state of the first object to the second product platform.

9. The computer-implemented method of claim 8, further comprising:
generating second object data for the second product platform, based on the updated information associated with the first object; and
transmitting the second object data to the second product platform.

10. The computer-implemented method of claim 8, further comprising generating an event indicating update of the first object and the second object.

11. The computer-implemented method of claim 8, wherein the first product platform is an issue tracking system.

12. The computer-implemented method of claim 8, wherein the second product platform is an incident management system.

13. A computer-implemented method, comprising:
rendering a user interface on a client application executing an instance of a first product platform on a client device, the user interface having a set of interactive affordances offered by the first product platform and a second product platform;
displaying an object stored on the first product platform on the user interface, the object identifiable by an object identifier;
receiving, through selection of an interactive affordance on the user interface by a user on the client device, a user request for a service associated with the object;
in response to receiving the user request, obtaining the object identifier and identifying the service;
communicating the object identifier and the identified service to a second product platform to cause the second product platform to perform the service associated with the object and generate object data associated with the service; and
receiving the object data and causing the object data to be displayed on the user interface.

14. The computer-implemented method of claim 13, wherein the service is identified using a service identifier generated by the selection of the interactive affordance on the user interface.

15. The computer-implemented method of claim 13, wherein the service comprises one or more of: assigning the object to a responder, generating an alert related to the object, providing a service status of the object, providing a commentary on the object, or initiating a communication session between the user and a responder of the object.

16. The computer-implemented method of claim 13, further comprising:
creating an integrated object using the received object data; and
communicating information about the integrated object to an event platform to generate an event about the creation of the integrated object.

17. The computer-implemented method of claim 16, wherein the user interface is configured as one of: an input form with fields provided for manual user input for each field, or an input form provided with pre-populated drop-down menus for each field.

18. The computer-implemented method of claim 13, further comprising:
updating the object using the received object data; and
communicating information about the updated object to an event platform to generate an event about the update of the object.

19. The computer-implemented method of claim 18, wherein updating the object using the received object data further comprises:
receiving, from the second product platform, a request for a current state of the object;
in response to receiving the request, determining the current state of the object using the object identifier;
transmitting the current state of the object to the second product platform to cause the second product platform to update the object data; and
receiving the updated object data from the second product platform.

20. The computer-implemented method of claim 13, wherein:
the first product platform is an issue tracking system; and
the second product platform is an incident management system.

* * * * *